(12) United States Patent
Oono

(10) Patent No.: US 8,352,693 B2
(45) Date of Patent: Jan. 8, 2013

(54) STORAGE CONTROL APPARATUS

(75) Inventor: Yoshinari Oono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 12/792,997

(22) Filed: Jun. 3, 2010

(65) Prior Publication Data

US 2010/0332779 A1 Dec. 30, 2010

(30) Foreign Application Priority Data

Jun. 25, 2009 (JP) ................................ 2009-151028

(51) Int. Cl.
*G06F 12/00* (2006.01)
(52) U.S. Cl. ........................................................ 711/162
(58) Field of Classification Search ......................... None
See application file for complete search history.

(56) References Cited

U.S. PATENT DOCUMENTS 7,203,814 B2 * 4/2007 Serizawa et al. ............... 711/202
7,684,073 B2 * 3/2010 Watanabe et al. ............ 358/1.15
8,046,551 B1 * 10/2011 Sahin ............................. 711/162
2003/0028737 A1 2/2003 Kaiya et al.
2007/0112893 A1 5/2007 Okada et al.

FOREIGN PATENT DOCUMENTS

JP 3606797 1/2005
JP 2007-140700 6/2007

* cited by examiner

*Primary Examiner* — Hiep Nguyen
(74) *Attorney, Agent, or Firm* — Staas & Halsey LLP

(57) ABSTRACT

A method for a storage control apparatus for controlling a plurality of storage units, each of the plurality of storage units having data area for storing data includes receiving a first command for copying data stored in a first data area of the storage units into a second data area of the storage units from an exterior, executing copying in accordance with the first command, receiving a second command for copying data stored in the second data area into the first data area from the exterior, executing copying in accordance with the second command, receiving a third command for cancelling copying corresponding to the first command and a fourth command for cancelling copying corresponding to the second command from the exterior until completion of copying process corresponding to at least one of the first and second command, and invalidating one of the third command and the fourth command.

20 Claims, 18 Drawing Sheets

FIG. 7

| Restore \ Exist | INPROGRESS | END | CANCEL |
|---|---|---|---|
| INPROGRESS | IN EXECUTION | IN EXECUTION | IN EXECUTION |
| END | IN EXECUTION | COMPLETION | COMPLETION |
| CANCEL | IN EXECUTION | COMPLETION | INHIBITION |

1150

STORAGE CONTROL APPARATUS

CROSS-REFERENCE TO RELATED APPLICATION

This application is based upon and claims the benefit of priority of the prior Japanese Patent Application No. 2009-151028, filed on Jun. 25, 2009 the entire contents of which are incorporated herein by reference.

FIELD

The embodiments discussed herein are related to storage control apparatuses in which, in accordance with a copying execution command, data stored in a data area of a copy source is copied into a data area of a copy destination.

BACKGROUND

In typical storage systems, in order to prevent loss of data due to failures of storage apparatuses and the like, data backup processing is regularly performed. In such data backup processing, data stored in a data area of a master side at a certain point of time is copied into a data area of a backup side. However, when recovered, increasing of an amount of copying data to a great degree is likely to lead to increasing of an amount time necessary for the recovery to a great degree. Therefore, a backup management method, in which data backup timings are determined so that an amount of time necessary for recovery can be fallen within a specified period of time, has been disclosed (refer to Japanese Laid-open Patent Publication No. 2007-140700).

However, during a period of time while copying processing is performed, data updating is disabled, so that jobs are halted, and thus, technologies which make it possible to reduce the period of time while jobs are halted owing to the copying processing to a maximum extent, have been desired. Therefore, a system, in which, upon receipt of a copying request, by setting management information indicating completion or incompletion of copying for each unit data area resulting from segmentation of a data area targeted for copying, logical copying processing is completed, and afterward, copying of real data is processed, has been disclosed (refer to Japanese Patent No. 3606797). Such a system enables accessing for data subsequent to completion of the logical copying processing.

Further, nowadays, for the purpose of not only backup of data but also utilization of data in various applications, data copying processing between storage devices has been widely performed. For example, there is an application, in which a block of data stored in a storage apparatus providing a certain online service is copied to a system at a certain point of time, and then, batch processing on the copied block of data is performed by using the copy-destination system. Thus, not only unidirectional copying processing from a copy-source storage apparatus to a copy-destination storage apparatus, such as data backup processing, but also reverse directional copying processing, has become increasingly popular.

However, to date, there has been a disadvantage in that, regarding control methods, in each of which a copying process commences in response to a copying request, problems, such as data uncertainty, are likely to occur depending on statuses of copying processes in execution, and commands received thereunder.

As described above, data backup processing performed at predetermined backup timings causes a problem in that jobs are halted during a period of time while copying processing is performed, and thus, is undesirable. Therefore, it is desirable to perform copying processing upon occurrence of a copying request; however, as described above, since copying processes are performed in various applications, copying requests arise therefrom on an irregular basis. In particular, in existing copying processing methods, in order to reduce an amount of time necessary for copying, upon receipt of a copying request, by setting only management information, data accessing is permitted, and afterword, copying of real data is performed. Thus, it takes a certain period of time from reception of a copying request until completion of copying of real data. During this period of time, it is possible to receive other copying requests, and also make requests for cancelling copying processes in execution.

For example, during a period of time while a copying process for relevant data areas is being performed, for the same data areas as the relevant data areas, a copying execution command, in which a copy source of the copying process in execution is specified as a copy destination, and a copy destination of the copying process in execution is specified as a copy source, is likely to be inputted, and in response to the inputted copying execution command, a copying process is likely to start to be performed. Under such a condition, if commands for canceling both of the copying processes are inputted, data uncertainty is likely to arise in both a copy-source storage apparatus and a copy-destination storage apparatus. Therefore, depending on statuses of the copying processes in execution and commands received thereunder, from a viewpoint of system reliability, the statuses of the storage apparatuses are likely to transit to undesirable conditions.

However, in copying control methods employed by existing storage systems, processing have been performed so that copying commands are independently processed, and statues of other copying processes in execution, having been commenced by other copying commands and the like, are not taken into consideration. Consequently, it has been difficult to prevent such a storage system from falling in undesirable conditions.

SUMMARY

According to an aspect of the invention, a storage control apparatus includes a first data area and a second data area for storing data, and a processor for executing a process including, receiving a first command for copying data stored in the first data area into the second data area at one point from an exterior, permitting accessing the data stored in the first data area and the second data area corresponding to the first command from the exterior whether the copy processing is completion or noncompletion, executing copying in accordance with the first command, receiving a second command for copying data stored in the second data area into the first data area at other point from the exterior, permitting accessing the data stored in the first data area and the second data area corresponding to the second command from the exterior whether the copy processing is completion or noncompletion, executing copying in accordance with the second command, and invalidating, when the storage control apparatus receives a third command for cancelling copying corresponding to the first command and a fourth command for cancelling copying corresponding to the second command from the exterior until completion of copying process corresponding to at least one of the first and second command, one of the third command and the fourth command.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating combined statuses according to an embodiment of the present invention.

DESCRIPTION OF EMBODIMENTS

Hereinafter, embodiments according to the present invention will be described with reference to drawings.

Figure 1:
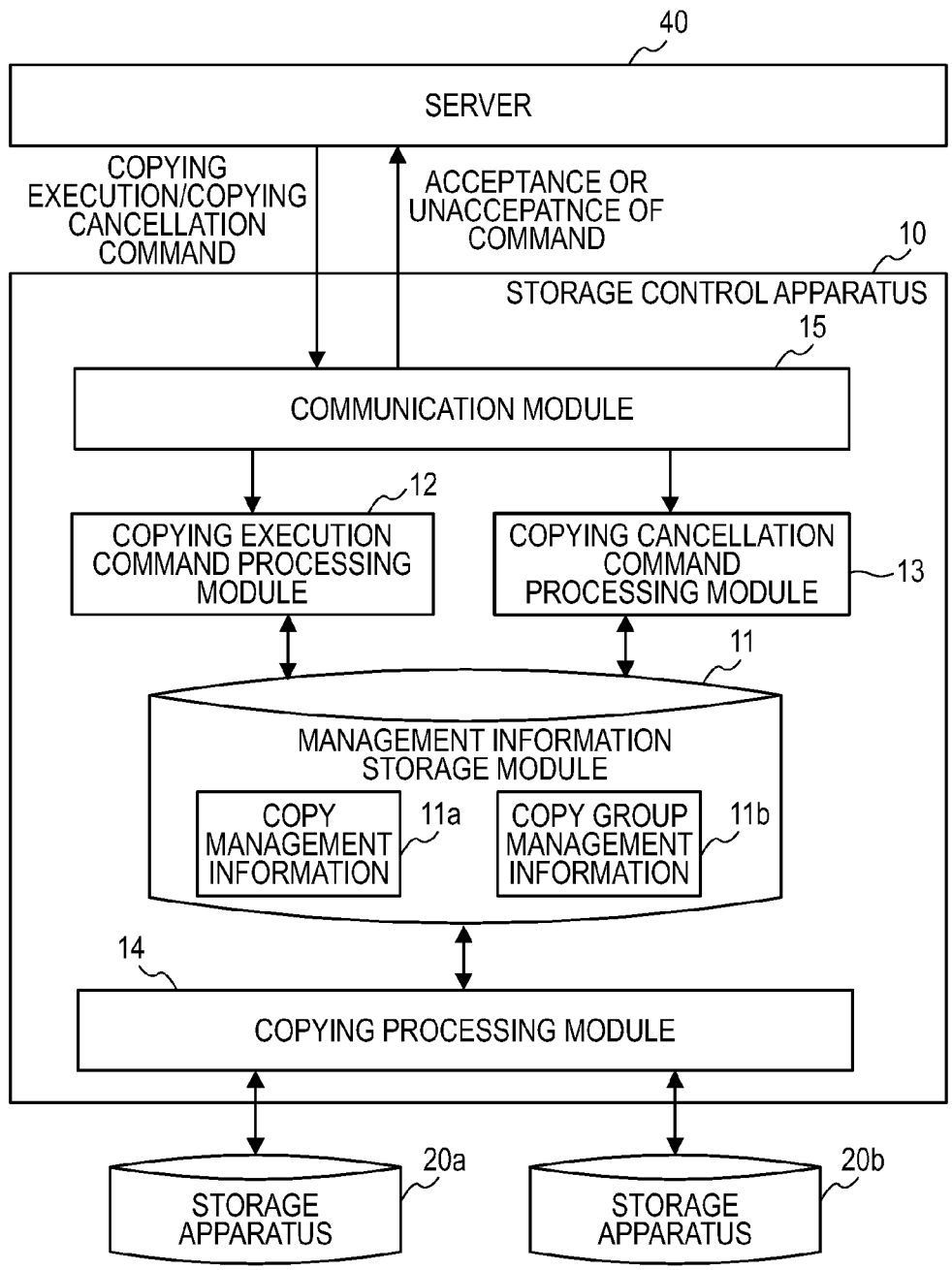
FIG. 1 is a diagram illustrating an example of a configuration of a storage control apparatus according to a first embodiment of the present invention.

FIG. 1 is a diagram illustrating an example of a configuration of a storage control apparatus according to a first embodiment of the present invention.

The storage control apparatus 10 is configured to include therein a management information storage module 11, a copying execution command processing module 12, a copying cancellation command processing module 13, a copying processing module 14 and a communication module 15, and manage storage apparatuses 20a and 20b. Further, the storage control apparatus 10 is configured to, upon receipt of requests from a server 40, such as an accessing command and a copying command, perform control of processing for accessing the storage apparatuses 20a and 20b, and processing for copying. Each processing module implemented in the storage control apparatus 10 can be realized by causing a computer to execute copying control programs.

In the management information storage module 11, copy management information 11a and copy group management information 11b are stored. In the copy management information 11a, with respect to each of copying processes in execution or waiting for execution, copying process information, including information for a copy-source data area and a copy-destination data area designated by a copying execution command, is registered so as to be associated with an identifier appended to this copying process. The copy management information 11a is an aggregation of pieces of copying process information, each of which is created in response to a copying execution command, and is deleted immediately after completion of a copying process corresponding thereto. In the case where, with respect to two copying processes, it is detected that a copy-source data area and a copy-destination data area for one copying process are overlapped by a copy-destination data area and a copy-source data area for the other one copying process, respectively, and further, a copy-source data area and a copy-destination data area for one copying process are interchanged with a copy-destination data area and a copy-source data area for the other one copying process, respectively, the copy group management information 11b is created for a group consisting of the two copying processes. For convenience, assuming that a previously instructed copying process is named a first copying process, and the other one is named a second copying process, a copy-source data area of the first copying process is a copy-destination data area of the second copying process, and a copy-destination data area of the first copying process is a copy-source data area of the second copying process. Further, an identifier of the first copying process and an execution status thereof (hereinafter, which will be called "status"), as well as an identifier of the second copying process and a status thereof, are registered in the copy group management information 11b.

The copying execution command processing module 12 is configured to, upon receipt of a copying execution command, create copying process information, being associated with a copying process instructed thereby, and including information relating to a designated data area and a designated copy-destination data area based on the received copying execution command, and register the created copying process information in the copy management information 11a. Further, the copying execution command processing module 12 is configured to, from existing copying process information registered in the copy management information 11a, search for a copying process, for which a copy-source data area thereof is overlapped by a designated copy-destination data area in accordance with the copying execution command having been received this time, and further, a copy-destination data area thereof is overlapped by a designated copy-source data area in accordance therewith. When detected, a piece of information, in which a piece of copying process information relating to a first copying process, having been already registered, and having been detected during the detection process described above, and another piece of copying process information relating to a second copying process in accordance with the copying command having been received this time are associated with each other, is registered in the copy group management information 11b together with pieces of status information relating to both of the copying processes.

The copying cancellation command processing module 13 is configured to, upon receipt of a copying cancellation command, search the copy management information 11a and the copy group management information 11b, and extract registration information relating to a copying process targeted for the cancellation. In the case where the targeted copying process has not been detected in the copy group management information 11b, but has been detected only in the copy management information 11a, since the current status is that, for targeted data areas, the copying process targeted for cancellation is being independently performed, the copying cancellation command is permitted to be accepted, and the relevant copying process is terminated. In the case where the targeted copying process has been detected in the copy group management information 11b, since the current status is that, for targeted data areas, the first copying process and the second copying process are being performed concurrently, it is determined whether a status, to which the current status transits subsequent to execution of the copying cancellation command, is an inhibition status, or not. Further, when it is determined that a status, to which the current status transits subsequent to execution of the copying cancellation command, is an inhibition status, the copying cancellation command is invalidated, and subsequently, an appropriate process is performed. For example, the copying cancellation command is rejected and the unacceptance thereof is notified to a sender thereof. Further, it is notified to the sender that execution of the copying cancellation command causes an undesirable condition. In addition, it is determined in advance what process is to be executed. In contrast, in the case where a status, to which the current status transits subsequent to execution of the copying cancellation command, is not an inhibition status, the copying cancellation command is validated.

The copying processing module 14 is configured to perform copying processes on the basis of the corresponding pieces of copying process information included in the copy management information 11a stored in the management information storage module 11. In each of the copying processes, a block of data stored in a copy-source data area is copied to a copy-destination area, the positions of the copy-source data storage area and the copy-destination data area being set in the piece of copying process information corresponding to the copying process. Further, upon completion of the designated copying process, the corresponding copying process information is deleted from the copy management information 11a. Further, the copying processing module 14 is configured to search the copy group management information 11b and confirm whether the same piece of copying process information as described above is registered in the copy group management information 11b, or not. When registered, a status corresponding to this piece of copying process information, the status being included in the copy group management information, is updated to a status representing the completion of a copying process.

The communication module 15 is configured to connect to an exterior (for example a server 40) via a network, receive commands, such as an accessing command, a copying execution command and a copying cancellation command, and perform accessing control, copying control of the storage apparatuses 20a and 20b, and the like, in accordance with the received commands. In particular, regarding the copying control, the communication module 15 is configured to transfer copying execution commands received from the server 40 to the copying execution command processing module 12, transfer copying cancellation commands to the copying cancellation command processing module 13, and further, transmit responses, each including acceptance or unacceptance of a received command, the responses being obtained from the copying execution command processing module 12 and the copying cancellation command processing module 13, to the server 40.

The storage apparatuses 20a and 20b are each configured to include storage areas for storing data therein, and access for data stored in the storage areas in accordance with accessing commands inputted thereto via the storage control apparatus 10. Further, the storage apparatuses 20a and 20b are each configured to read out data stored in storage areas designated in accordance with read commands issued by the copying processing module 14, and write data into storage areas designated in accordance with write commands issued by the copying processing module 14.

The server 40 is configured to execute predetermined application processes, and when necessary, issue accessing commands to the storage apparatuses 20a and 20b via the storage control apparatus 10. For example, the server 40 transmits accessing requests to a logical storage, and the storage control apparatus 10 converts these accessing requests into accesses to a real storage area included in the storage apparatus 20a or the storage apparatus 20b, and then, performs the accesses thereto. Further, in accordance with requests from administrators, the server 40 is configured to issue copying execution commands and copying cancellation commands to the storage control apparatus 10.

Process statuses of copying processes performed in response to copying execution commands are managed in advance by using status information. Further, when it is presumed that execution of an inputted copying cancellation command causes the process statuses of copying processes in execution transit to inhibition statuses, which are defined in advance, the copying cancellation command is invalidated. The storage control apparatus enables preventing storage apparatuses from transiting to undesirable conditions. The storage control apparatus which enable preventing storage apparatuses from transiting to undesirable conditions owing to copying processing.

Hereinafter, operations performed by the storage control apparatus 10A having such a configuration as described above and a method for copying control performed thereby will be described.

Firstly, a case, in which a copying process is independently performed, will be described below.

Once a copying execution command is inputted to the storage apparatus 10 from the exterior, the copying execution command processing module 12 extracts information relating to a designated copy-source data area and a designated copy-destination data area from the copying execution command. The copying execution command processing module 12 creates copying process information, being associated with the requested copying process, and including the extracted information relating to a designated copy-source data area and a designated copy-destination data area, and registers the created copying process information in the copy management information 11a. Further, the copying execution command processing module 12 searches the copy management information 11a, and from previously registered copying process information included therein, searches for copying process information having a copy-source data area overlapped by the designated copy-source data area and a copy-destination data area overlapped by the designated copy-destination data area. That is, with respect to the same data areas as those designated by the inputted copying execution command, the copying execution command processing module 12 confirms existence or nonexistence of any previously registered copying process (i.e., a first copying process) being performed in the direction reverse to the direction designated by the copying execution command. If not searched, it follows that the first copying process on the same data areas as those designated by the inputted copying execution command is not being performed. That is, in this case, it is determined that an independent copying process is being performed, and any other first copying processes on the same data areas are not being performed. The copying execution command processing module 12 appends an identifier for identifying each copying process to the copying process, creates a piece of copying process information so as to be associated with the identifier on the basis of the copying execution command, the piece of copying process information, being used when performing the corresponding copying process, and including information regarding a copy-destination data area, a copy-source data area and the like, and registers the created piece of copying process information in the copy management information 11a.

The copying processing module 14 may permit accessing the data stored in the copy-source data area and the copy-destination data area corresponding to the copying execution command from the exterior whether the copy process is completion or noncompletion.

The copying processing module 14 performs copying processes on the basis of copy management information included in the copy management information 11a. For example, the copying process is performed for each of data areas resulting from segmentation of a data area. Further, the copying process is terminated when all pieces of data stored in the copy-source data areas have been completely copied to the copy-destination data areas. The copying processing module 14 confirms whether this copying process is included in the copy group management information 11b, or not. Here, since this copying process is not included in the copy group management information 11b, a piece of copying process information relating to the relevant copying process is deleted from the copy management information 11a. In addition, upon receipt of a copying cancellation command while a copying process targeted for the cancellation is being executed, the copying cancellation command processing module 13 confirms whether this copying process targeted for the cancellation is registered in the copy group management information 11b, or not. In this case, since the copying process targeted for the cancellation is not registered in the copy group management information 11b, the copying cancellation command processing module 13 interrupts the relevant copying process, and deletes a piece of copying process information relating to the relevant copying process from the copy management information 11a.

Next, a case, in which a second copying process is performed concurrently with a first copying process, will be described below.

It is assumed that, after a piece of copy management information relating to a copying process on certain data areas was registered in the copy management information 11a in accordance with the procedure described above, currently, a copying process is being performed by the copying processing module 14. This copying process is named a first copying process. Here, it is assumed that a command for requesting a second copying process on the data areas, on which the first copying process is currently being performed, has been received. A copy-source data area for the second copying process is a copy-destination data area for the first copying process, and a copy-destination data area for the second copying process is a copy-source data area for the first copying process. The copying execution command processing module 12 creates a piece of copy management information relating to the second copying process on the basis of the received copying execution command, and registers the created piece of copy management information in the copy management information 11a. Further, the copying execution command processing module 12 searches the copy management information 11a, and thereby, detects a piece of copy management information corresponding to the first copying process having been instructed by a previously issued copying execution command. Further, the copying execution command processing module 12 causes an identifier of the first copying process and an identifier of the second copying process to correspond to a certain status of the first copying process and a certain status of the second copying process, respectively, and registers these pieces of information in the copy group management information 11b. The statuses used for management of each copying process is, for example, "Copying process in progress", "Copying process completed" and "Copying process canceled". The "Copying process in progress" is a condition in which a copying process is currently being performed, and is a status which is initially set by a received copying command. The "Copying process completed" is a condition in which a copying process has been completed. The "Copying process canceled" is a condition in which a copying process is interrupted by a received copying cancellation command.

The copying processing module 14 executes the first copying process and the second copying process on the basis of the copy management information 11a. When either of these copying processes has been completed, the copying processing module 14 updates a status corresponding to either of the copying processes to "Copying process completed", and deletes a piece of copy management information relating to the relevant copying process. When both of the first copying process and the second copying process have been completed, the copying processing module 14 deletes relevant pieces of copy management information from the copy group management information 11b and the copy management information 11a. When a copying cancellation command is received while executing the first copying process and the second copying process, the copying processing module 14 conforms whether one of the first copying process and the second copying process, which is instructed by the copying cancellation command as a target for cancellation, is registered in the copy group management information 11b, or not. In this case, since one of the first copying process and the second copying process, which is targeted for the cancellation, is registered, the copying processing module 14 confirms a status of the other copying process, which is not targeted for the cancellation. Further, when a status of the copying process targeted for the cancellation has transited to "Copying process canceled", the copying processing module 14 determines whether a combination status resulting from combination of a status of the copying process, which is targeted for the cancellation, and a status of the other copying process, which is not targeted for the cancellation, is to be caused to transit to an inhibition status, or not. For example, assuming that, in the case where statuses of both of the copying processes are "Copying process cancelled", a combination status resulting from combination of these statuses is defined as an inhibition status, it is determined that the combination status is an inhibition status when a status of the other copying process is "Copying process cancelled". When the copying processing module 14 determines that the combination status is to be caused to transit to an inhibition status, the copying processing module 14 invalidates the copying cancellation command, and subsequently, performs processing for rejecting the acceptance of command, and the like.

As a result of executing the above-described process procedure, it is possible to prevent occurrence of an undesired condition in which data included in data areas of the storage apparatuses 20a and 20b are uncertain owing to execution statues of copying processes and received commands.

In addition, in the above-described explanation, processing is performed so that, upon receipt of a copying cancellation command, it is determined whether executions instructed by the received command can be accepted, or not, but, processing may be performed so that, upon receipt of a copying cancellation command or other commands related to copying, it is determined whether executions instructed by the received commands can be accepted, or not, in the same manner as described above.

Next, as a second embodiment according to the present invention, a case, in which a disc control apparatus is applied to a disc system which receives copying execution commands from a plurality of terminals, will be described below.

Figure 2:
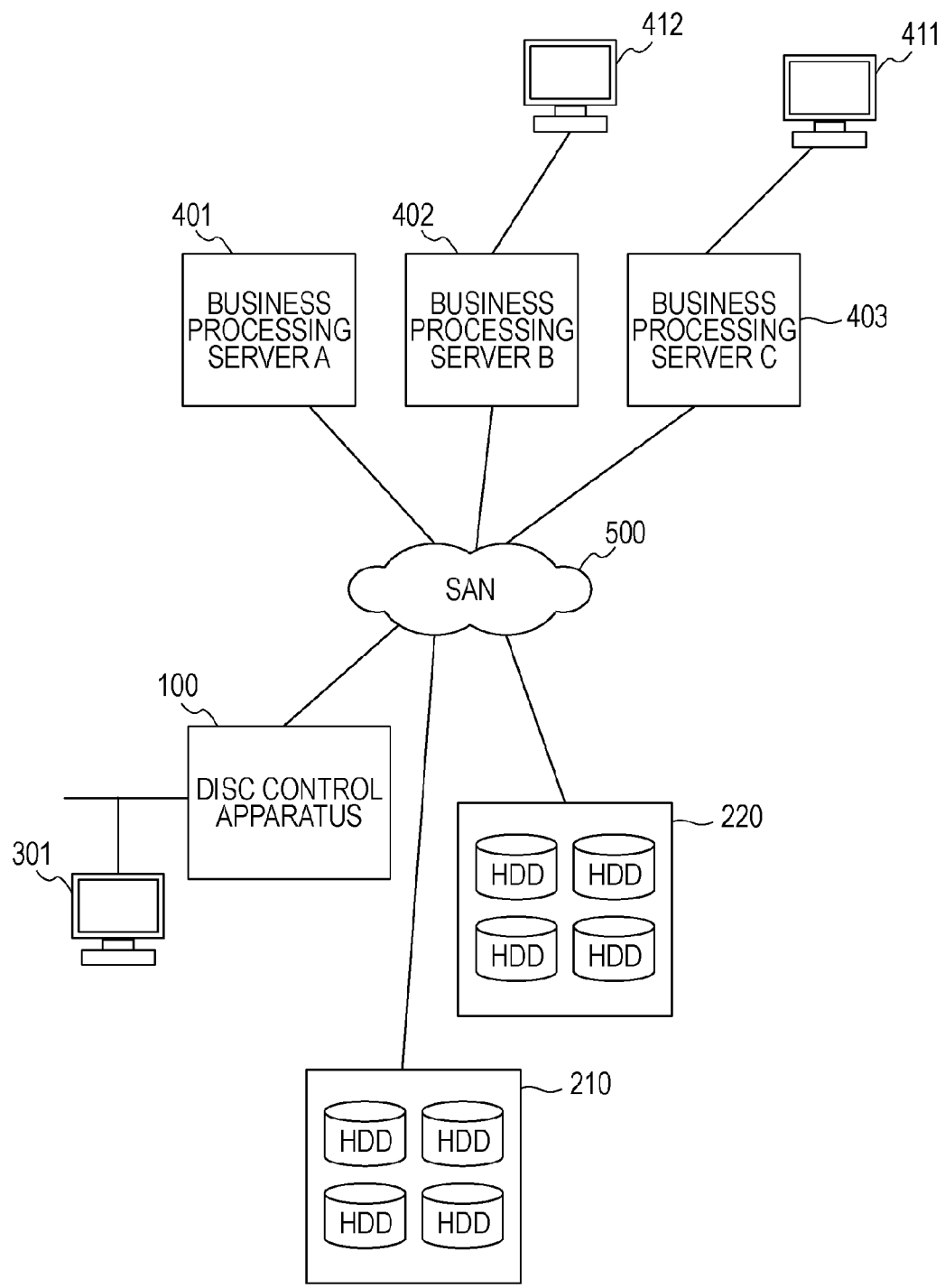
FIG. 2 is a diagram illustrating an example of a configuration of a disc system according to a second embodiment of the present invention.

FIG. 2 is a diagram illustrating an example of a configuration of a disc system according to a second embodiment of the present invention.

The disc system is configured to include a disc control apparatus 100, and disc apparatuses 210 and 220, which are connected to a business processing server A 401, a business processing server B 402 and a business processing server B 403 via a storage area network (SAN) 500.

The disc control apparatus 100 is configured to manage the disc apparatuses 210 and 220, and perform control of accessing processes and copying processes relating to data stored in real data areas included in the disc apparatuses 210 and 220. Here, functions of processes other than the accessing processes and copying processes are omitted from description. The disc apparatuses 210 and 220 are each configured to include data areas for storing therein data used for business processing, backup data therefor and the like.

The business processing servers A 401, B 402 and C 403 are each configured to execute prescribed business processes, and in accordance with the business processes, access data areas included in the disc apparatuses 210 and 220 via the disc control apparatus 100. Further, the business processing servers A 401, B 402 and C 403 are each configured to transmit copying execution commands, copying cancellation commands and the like received from user terminals 411 and 412 to the disc control apparatus 100.

A maintenance terminal 301 is configured to be connected to the disc control apparatus 100 via a local area network (LAN) for maintenance, and transmit copying execution commands and copying cancellation commands issued by maintenance administrators to the disc control apparatus 100.

Figure 3:
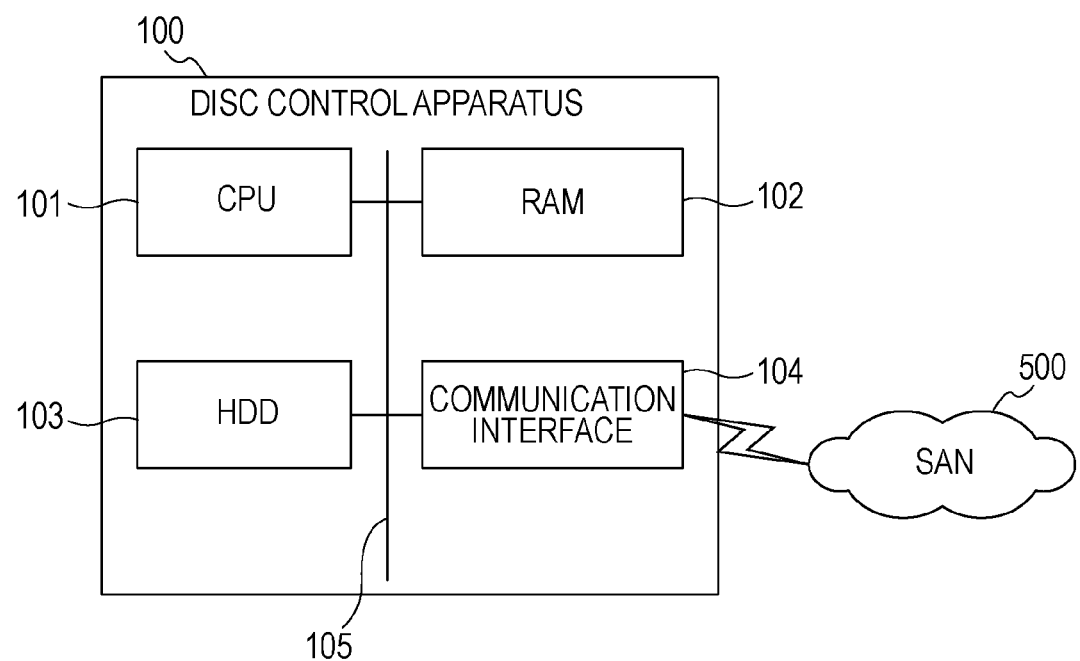
FIG. 3 is a diagram illustrating an example of a hardware configuration of a disc control apparatus according to an embodiment of the present invention.

Next, a hardware configuration of the disc control apparatus 100 will be described below. FIG. 3 is a diagram illustrating an example of a hardware configuration of the disc control apparatus 100.

The disc control apparatus 100 is configured to include a central processing unit (CPU) 101 for controlling the whole of the apparatus, to which a random access memory (RAM) module 102, a HDD 103, and a communication interface 104 are connected via a bus 105.

The RAM module 102 is configured to temporarily store therein OS and at least a part of application programs executed by the CPU 101. Further, the RAM module 102 is configured to store therein various kinds of data necessary for processes performed by the CPU 101. The HDD 103 is configured to store therein OS and application programs. The communication interface 104 is configured to be connected to the SAN 500, and via the SAN 500, transmit and receive data to/from the business processing servers A 401, B 402 and C 403, and the disc apparatuses 210 and 220.

Providing such a hardware configuration as described above enables realization of process functions of the disc control apparatus 100. In addition, in FIG. 3, a hardware configuration of the disc control apparatus 100 is illustrated, and a hardware configuration of each of other apparatuses constituting the disc system is the same as or similar to that of the disc control apparatus 100.

Next, a software configuration of the disc control apparatus will be described below. In the following description, it is assumed that a copying process which is independently performed and also a first copying process of the group of copying processes is a copy process. Further, it is assumed that a second copying process performed by the other one of the group of copying processes is a restore copy process.

Figure 4:
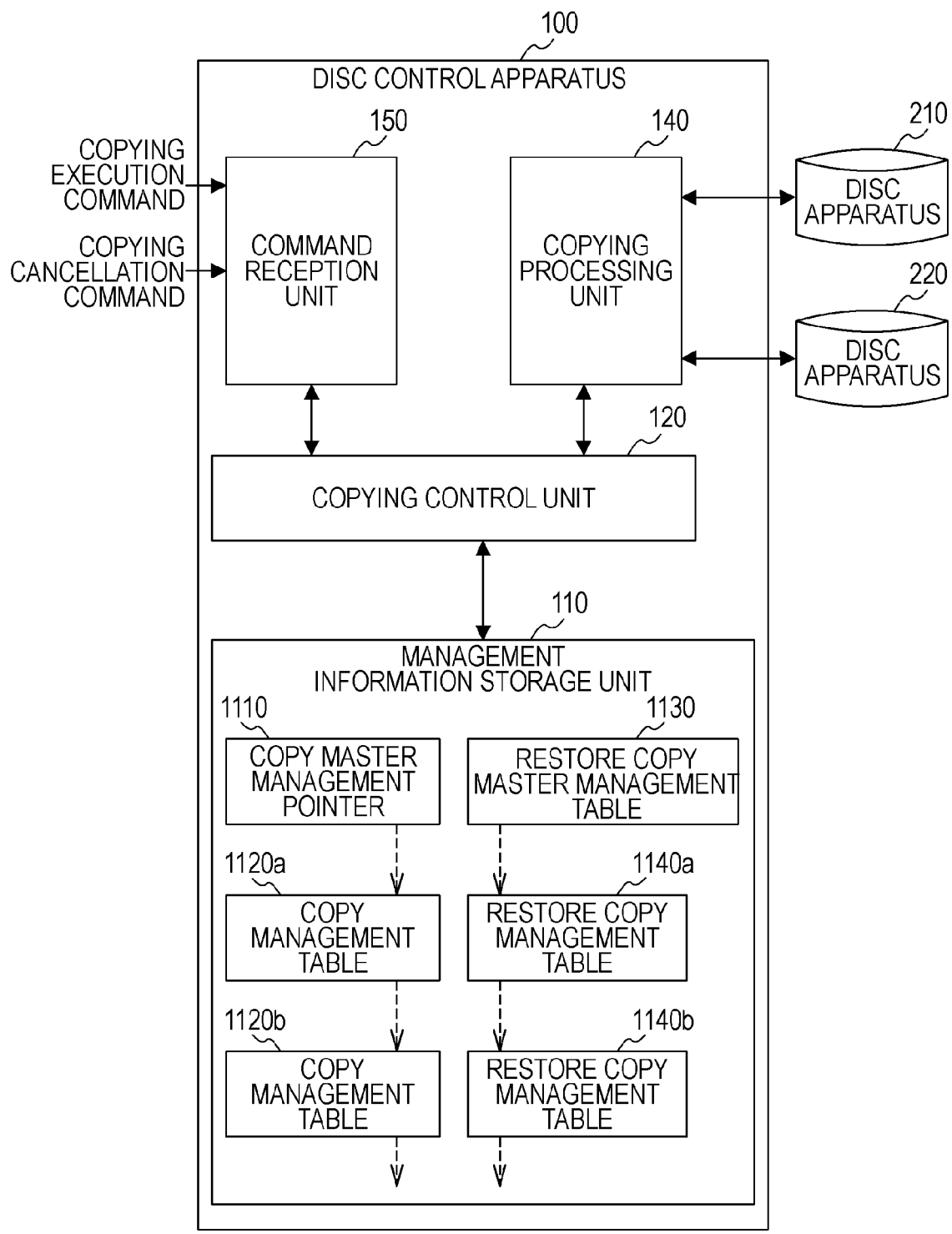
FIG. 4 is a diagram illustrating an example of a software configuration of a disc control apparatus according to an embodiment of the present invention.

FIG. 4 is a diagram illustrating an example of a software configuration of the disc control apparatus 100.

The disc control apparatus 100 is configured to include therein a management information storage unit 110, a copying control unit 120, a copying processing unit 140 and a command reception unit 150, and perform control of copying processes performed by the disc apparatuses 210 and 220.

The management information storage unit 110 is configured to function as the management information storage module 11. A copy master management pointer 1110 and copy management tables 1120a, 1120b, . . . are configured to be used as the copy management information 11a. Every time a copying execution command is received, a copy management table is sequentially created, and this sequential creation results in the copy management tables 1120a, 1120b, . . . , illustrated in FIG. 4. Each of these copy management tables 1120a, 1120b, . . . is linked to an immediately previously created copy management table. Further, the initial link is set in the copy master management pointer 1110. By following the links initiating from the copy master management pointer, it is possible to search the copy management tables 1120a, 1120b, . . . corresponding to each of copying processes in progress. A restore copy master management pointer 1130 and restore copy management tables 1140a, 1140b, . . . are configured to be used as the copy group management information 11b. Every time it is determined that a received copying command is a restore copying execution command, a restore copy management table is sequentially created, and this sequential creation results in the restore copy management tables 1140a, 1140b, . . . , illustrated in FIG. 4. The structure of links connecting the restore copy management pointer 1130 and the restore copy management tables 1140a, 1140b, . . . is the same as or similar to that of the links connecting the copy master management pointer 1110 and the copy management tables 1120a, 1120b, . . . .

The copying control unit 120 is configured to function as the copying execution command processing module 12 and the copying cancellation command processing module 13, and perform control of copying processes. The copying processing unit 140 is configured to function as the copying processing module 14. The command reception unit 150 is configured to function as the communication module 15, and receive copying execution commands and copying cancellation commands from user terminals 411 and 412, which are inputted via the business processing servers, and copying execution commands and copying cancellation commands from the maintenance terminal 301, and transfer these commands to the copying control unit 120.

Next, the copy master management pointer 1110, the copy management tables 1120a, 1120b, . . . , the restore copy master management pointer 1130 and the restore management tables 1140a, 1140b, . . . will be described below.

Figure 5:
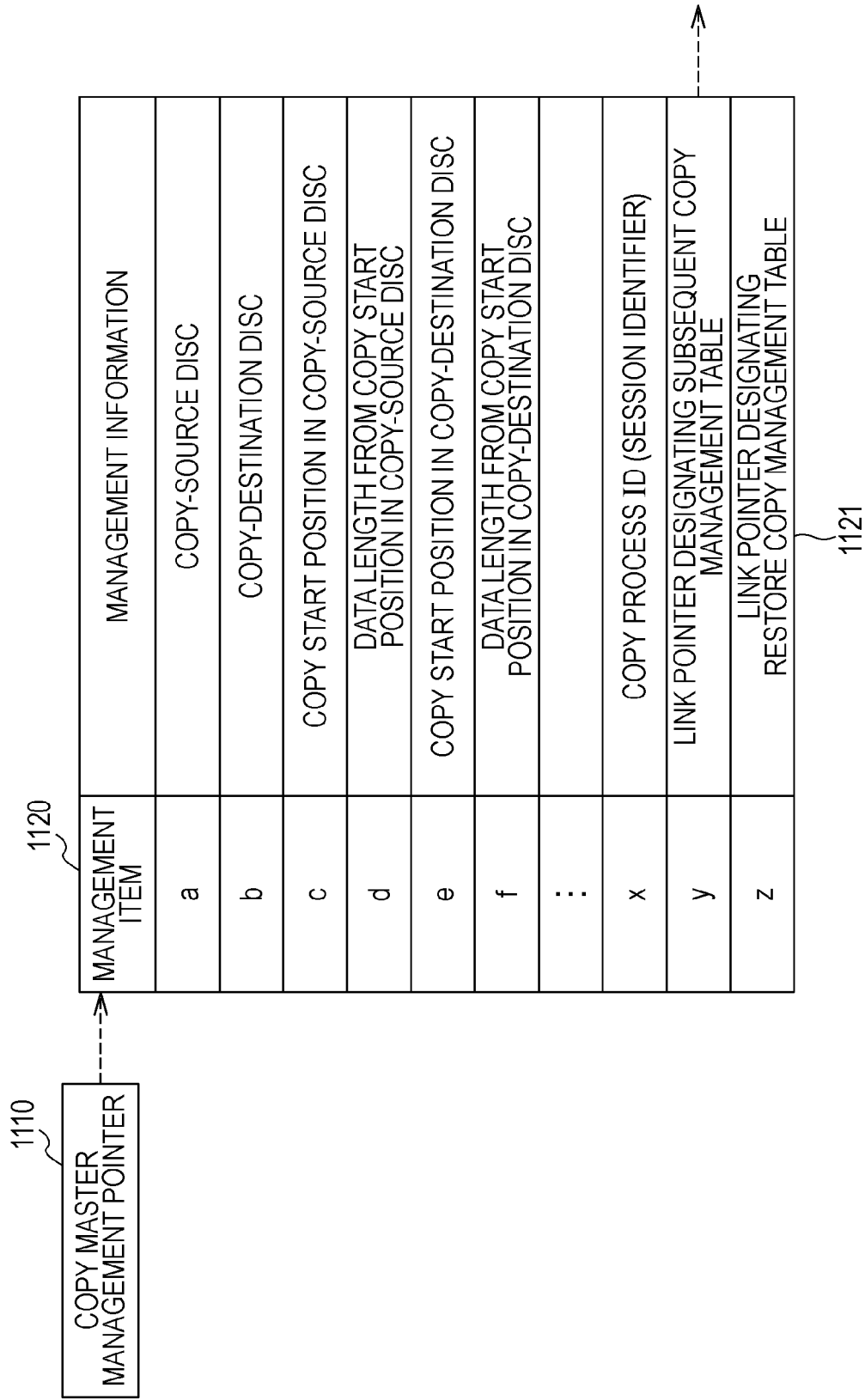
FIG. 5 is a diagram illustrating an example of a copy master management pointer and a copy management table according to an embodiment of the present invention.

FIG. 5 is a diagram illustrating an example of a copy master management pointer and a copy management table.

The copy master management pointer 1110 is an initial pointer designating a reference area of the created copy management table 1120. Every time a session in which a series of copying processes are performed is created in accordance with a received copying execution command, the copy management table 1120 managing the created session is sequentially created, and is inked to an immediately previously created copy management table 1120.

The copy management table 1120 is created for each session, and management information 1121 is set therein. For each created session, the management information 1121 includes therein management items, such as (a) a copy-source disc, (b) a copy-destination disc, (c) a copy start position in the copy-source disc, (d) a data length from the copy start position in the copy-source disc, (e) a copy start position in the copy-destination disc, (f) a data length from the copy start position in the copy-destination disc, . . . , (x) a copy ID (a session identifier), (y) a link pointer designating a copy management table, and (z) a link pointer designating a subsequent restore copy management table.

The management items: (a) a copy-source disc; (c) a copy start position in the copy-source disc; and (d) a data length from the copy start position in the copy-source disc, are designation information designating a copy-source data area. In addition, the data length from the start point in the copy-source disc may be a copy end position in the copy-source disc.

The management items: (b) a copy-destination disc; (e) a copy start position in the copy-destination disc; and (f) a data length from the copy start position in the copy-destination disc, are designation information designating a copy-destination data area. In addition, the data length from the start point in the copy-destination disc may be a copy end position in the copy-destination disc.

In the management item: (x) a copy process ID (a session identifier), a session identifier for identifying a series of copying processes (i.e., a session) is set.

In the management item: (y) a link pointer designating a subsequent copy management table, in the case where a copy management table relating to a subsequent copy process exists, a link pointer designating this copying process is set. Every time a session i.e., a series of copy processes, is created, the copy management table 1120 is sequentially created, and is linked to an immediately previously created copy management table. Therefore, by sequentially following the links from the copy master management pointer 1110 to link pointers included in respective copy tables, it is possible to access all the created copy management tables. In addition, in the case where there is no copy management table to be subsequently linked, a value of "NULL" is set in the link pointer.

The management item; (z) a link pointer designating a restore copy management table is set when this session is registered in a restore copy management table managing a restore copy process corresponding thereto. This link pointer designates the corresponding restore copy management table. In addition, in the case where there is no restore copy management table corresponding to the copy management table, a value of "NULL" is set in this link pointer.

By using such the copy master management pointer 1110 and the copy management table 1120, copying processes are executed.

Figure 6:
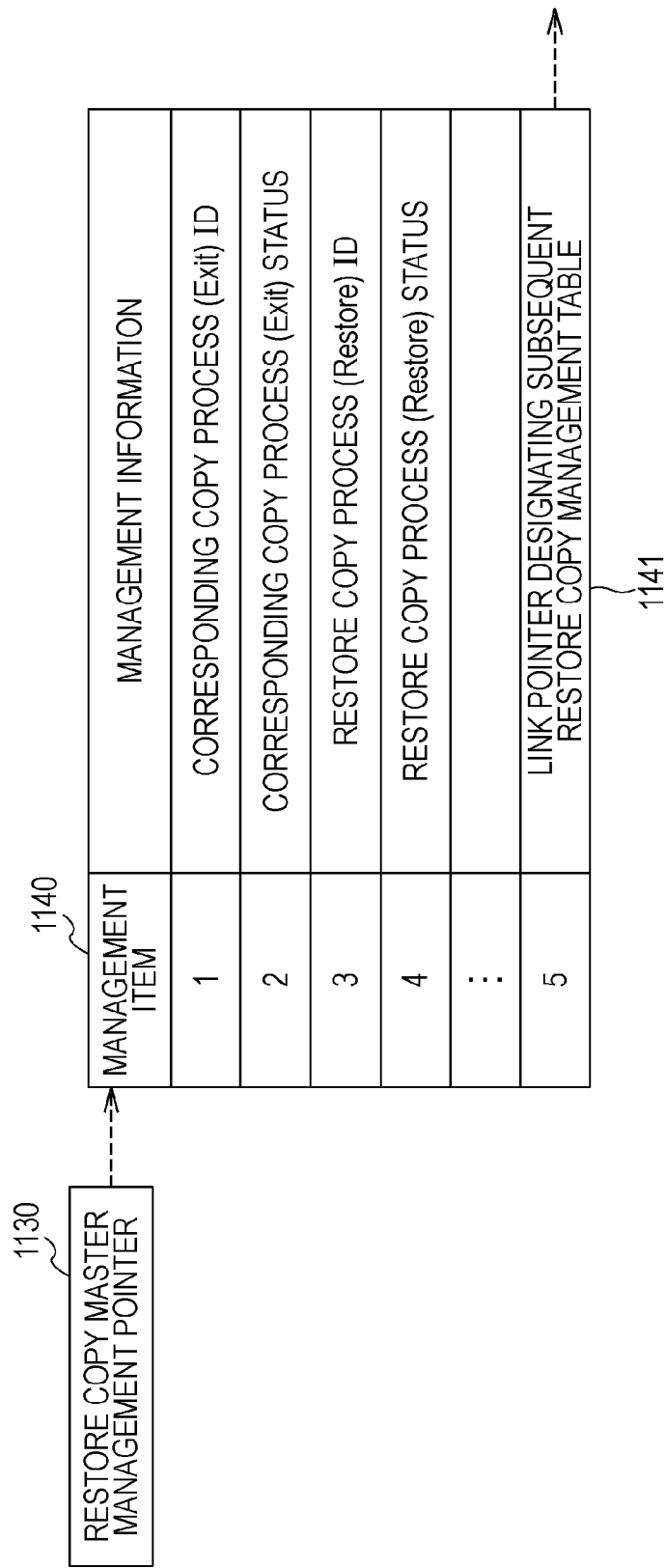
FIG. 6 is a diagram illustrating an example of a restore copy master management pointer and a restore copy management table according to an embodiment of the present invention.

FIG. 6 is a diagram illustrating an example of a restore copy master management pointer and a restore copy management table.

The restore copy master management pointer 1130 is an initial pointer designating a reference position of the created restore copy management table 1140. Once a session relating to a restore copy process is created, the restore copy management table 1140 managing this created session is linked to the restore copy master management pointer 1130.

The restore copy management table is created for each session, and has management information 1141 set therein. In addition, in the restore copy management table 1140, a series of corresponding copy processes and a series of restore copy processes are named "Exist" and "Restore", respectively. For each created session, the management information 1141 includes therein management items, such as (1) a corresponding copy process (Exist) ID, (2) a corresponding copy process (Exist) status, (3) a restore copy process (Restore) ID, (4) a restore copy process (Restore) status and (5) a link pointer designating a restore copy management table.

In the corresponding copy process (Exist) ID, a session identifier, which is set in a corresponding copy process (Exist) corresponding to a restore copy process, is set. This session identification is the same as the (x) copy process ID included in the copy management table 1120. It is possible to search a copy management table relating to a corresponding copy process from the registered corresponding copy process (Exist) ID.

In the corresponding copy process (Exist) status, a status in accordance with a current condition of an operation being performed by a corresponding copy process is set. With respect to the status to be set, it is assumed that there are three kinds of statuses, the first one being "INPROGRESS" denoting "Copying process in progress", the second one being "END" denoting "Copying process completed, the third one being "CANCEL" denoting "Copying process cancelled. When the restore copy management table 1140 is created, as an initial status, the status "INPROGRESS" is set in the corresponding copy process (Exist) status. When the relevant corresponding copy process has been completed, the status "END" is set therein. Further, when the relevant corresponding copy process has been cancelled, the status "CANCEL" is set therein.

In the (3) restore copy process (Restore) ID, a session identifier given to a restore copy process, is set. This session identifier is the same as the (x) copy process ID included in the copy management table 1120. Therefore, it is possible to search a copy management table relating to a copy process corresponding to this restore copy process from this registered restore copy process (Restore) ID.

In the (4) restore copy process (Restore) status, a status in accordance with a current condition of an operation being performed by a restore copy process is set. The content of the status is the same as that of the (2) corresponding copy process (Exist).

In the (5) link pointer designating a restore copy management table, in the case where there is a restore copy management table to be linked, corresponding to a restore copy process, a link pointer designating this restore copy management table to be linked is set. Every time a session relating to a restore copy process is created, the restore copy management table 1140 is created, and copy management tables, each of which is created every time a session relating to a copy process is created, are sequentially linked via the link pointer designating a subsequent copy management table. In addition, in the case where there is no restore copy management table to be subsequently linked, a value of "NULL" is set therein.

By using the copy master management pointer 1110, the copy management table 1120, the restore copy master management pointer 1130 and the restore copy management table 1140, which were described above, copy processes and restore copy processes are managed.

Here, statuses of each copy process and an inhibition status will be described below. FIG. 7 is a diagram illustrating combinations of statuses.

As described above, with respect to the status, there are three kinds of statuses, the first one being "INPROGRESS" denoting "Copying process in progress", the second one being "END" denoting "Copying process completed, the third one being "CANCEL" denoting "Copying process cancelled.

In combined statuses 1150, statuses of Exist are represented in the horizontal direction, and statuses of Restore are represented in the vertical direction.

When Exist starts a copy process, and further, Restore starts a restore copy process, the combined status transits to a status "IN EXECUTION", in which both are in execution, that is, (INPROGRESS-INPROGRESS). In addition, with respect to the inside of ( ), a status preceding to "-" illustrates a status of Exist, and a status subsequent to "-" illustrates a status of Restore. When a status, in which Exist has completed the copy process, and further, only Restore is performing the restore copy process, occurs, the combined status transits to a status "IN EXECUTION", in which only Restore is performing the restore copy process, that is, (END-INPROGRESS). Subsequently, when Restore has also completed the restore copy process, the combined status transits to a status "END", in which Exist has completed the copy process, and further, Restore has completed the restore copy processes, that is (END-END). Further, under the status "IN EXECUTION", in which both are in execution, that is, (INPROGRESS-INPROGRESS), when the copy process being performed by Exist is cancelled, the combined status transits to a status "IN EXECUTION", in which only Restore is in execution, that is, (CANCEL-INPROGRESS). Subsequently, when Restore has completed the restore copy process, the combined status transits to a status "COMPLETION", in which Exist has completed the copy process, and further, Restore has completed the restore copy processes, that is (END-END).

Further, under the status "IN EXECUTION, in which both are in execution, that is, (INPROGRESS-INPROGRESS), when Restore has completed the restore copy process, and Exist continues the copy process, the combined status transits to a status "IN EXECUTION", in which only Exist is in execution, that is, (INPROGRESS-END). Further, when Exist has also completed the copy process, the combined status transits to a status "COMPLETION, in which Exist has completed the copy process, and further, Restore has completed the restore copy processes, that is (END-END). Moreover, under the status in which both are in execution, that is, (INPROGRESS-INPROGRESS), when the restore copy process being performed by Restore is cancelled, the combined status transits to a status (INPROGRESS-CANCEL). Subsequently, when Exit has completed the copy process, the combined status transits to "COMPLETION", that is, (END-END).

As described above, under the condition where a copy process and a restore copy process are both in execution, even when one of the copy process and the restore copy process is cancelled, as well as, naturally when one of the copy process and the restore copy process has been completed, subsequent to completion of the other's process, at least one of the data copy processes has been normally completed.

Here, under the condition where a copy process and a restore copy process are both in execution, when a situation, in which the copy process being performed by Exist is cancelled, and prior to completion of the restore copy process being performed by Restore, the restore copy process is canceled, occurs, the situation results in abnormal completion of both of the data copy processes, and thus, causes uncertainty of data targeted for copying. Accordingly, a combined status resulting from combination of "CANCEL" for Exist and "CANCEL" for Restore, that is, (CANCEL-CANCEL), is defined in advance as an inhibition status.

In addition, the inhibition status can be arbitrarily defined in advance by administrators. For example, a combined status, in which, under the status where Exit and Restore are both in execution, that is, (INPROGRESS-INPROGRESS), either of Exit or Restore transits to "CANCEL", may be defined as an inhibition status.

Hereinafter, copy control processes performed by the disc control apparatus 100 will be described in detail. Firstly, operations from commencement of a copy process performed by Exist until commencement of a restore copy process performed by Restore will be described.

Figure 8A:
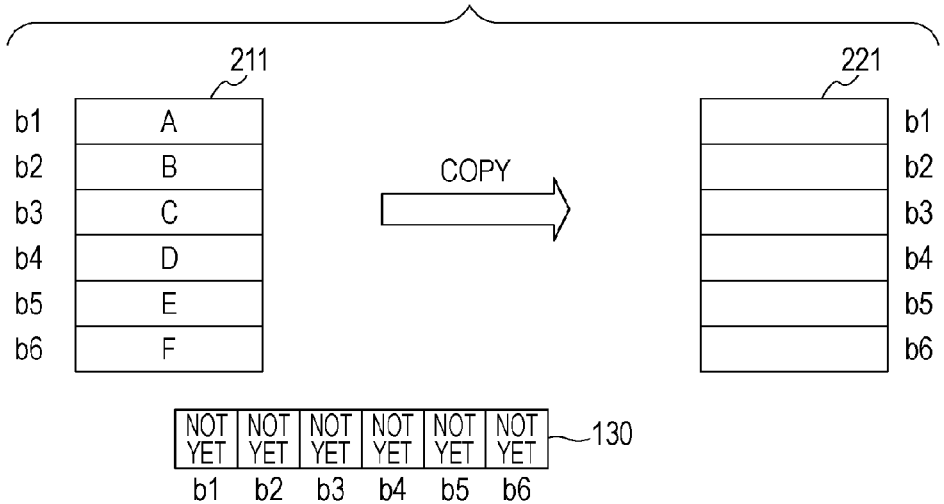
FIGS. 8A and 8B are diagrams each illustrating a flow of a copy process, according to an embodiment of the present invention.
Figure 8B:
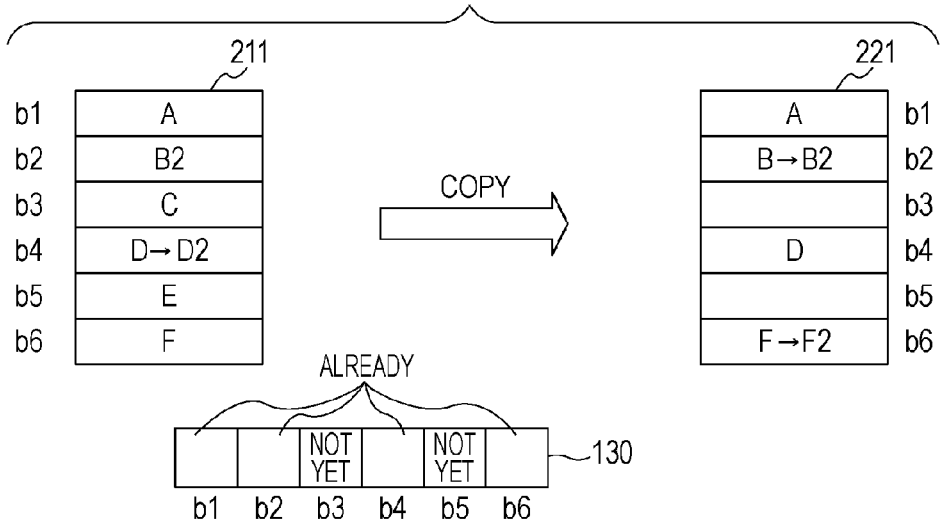

FIGS. 8A and 8B are diagrams each illustrating a flow of a copy process. FIG. 8A illustrates operations performed subsequent to reception of a copying execution command. FIG. 8B illustrates operations performed while a copy process is being executed.

As illustrated in FIG. 8A, which illustrates operations performed subsequent to reception of a copying execution command, upon receipt of a copying execution command, on the basis of the copying execution command, the copying control unit 120 specifies a copy-source data area (hereinafter, which will be called a copy source) 211, and a copy-destination data area (hereinafter, which will be called a copy destination) 221.

Each of the copy source 211 and the copy-destination 221 is segmented into a plurality of blocks, each having a predetermined data size, in advance. Here, for convenience, it is assumed that each of the blocks is denoted by b1, b2, b3, b4, b5, and b6. At the timing when a copying execution command is received, the copy source 211 stores data A in the block b1, data B in the block b2, data C in the block b3, data D in the block b4, data E in the block b5, and data F in the block b6. In the copying execution process, the data (A, B, C, D, E, F), which is stored in the data area of the copy source 211 at the timing when the copying execution command has been received, is copied to the data area of the copy-destination 221.

The copying control unit 120 creates a bitmap 130 as management information for the blocks. The bitmap 130 has bits, each corresponding to a block and indicating completion or incompletion of the copy process relating to the block. In the example illustrated in FIG. 8, the block b1 corresponds to the bit b1. The others are the same. Further, "NOT YET" denotes incompletion of the corresponding copy process, and "ALREADY" denotes completion of the corresponding copy process, and, for example, "1" (=NOT YET)/"0" (=ALREADY) is set therein. The "NOT YET" is set in each bit as an initial value upon receipt of a copying execution command.

As illustrated in FIG. 8B, which illustrates operations performed while a copy process is being executed, a copy process is performed for each block. The copy process relating to the blocks is performed in an order from the block b1 to the block b2, and blocks of data are copied to the block b1 and the block b2 of the copy-destination 221. Here, while the copy process is being performed, upon occurrence of a request for changing data stored in the block b4 of the copy source 211, that is, "D"→"D2", the data "D", which existed in the block b4 at the timing when the copying execution command was received, is copied to the copy-destination 221 with a higher priority, and afterward, the data "D" of the copy source 211 is rewritten to "D2". Further, while the copy process is being performed, upon occurrence of a request for changing data stored in the block b6 of the copy-destination 221, the data targeted for the change being data before execution of copying, that is, "F"→"F2", the data "F", which is stored in the block b6 of the copy source 211, is copied to the copy-destination 221 with a higher priority, and afterward, is rewritten to "F2". In such a manner as described above, when any access request occurs while a copy process is being performed, copying of data which is stored in a block targeted for the access is performed with a higher priority, and after completion of copying of data stored in the relevant block, the corresponding bit of the bitmap 130 is updated from "NOT YET" to "ALREADY".

Next, it is assumed that, while such a copy process is being performed, a restore copying execution command has been received.

Figure 9A:
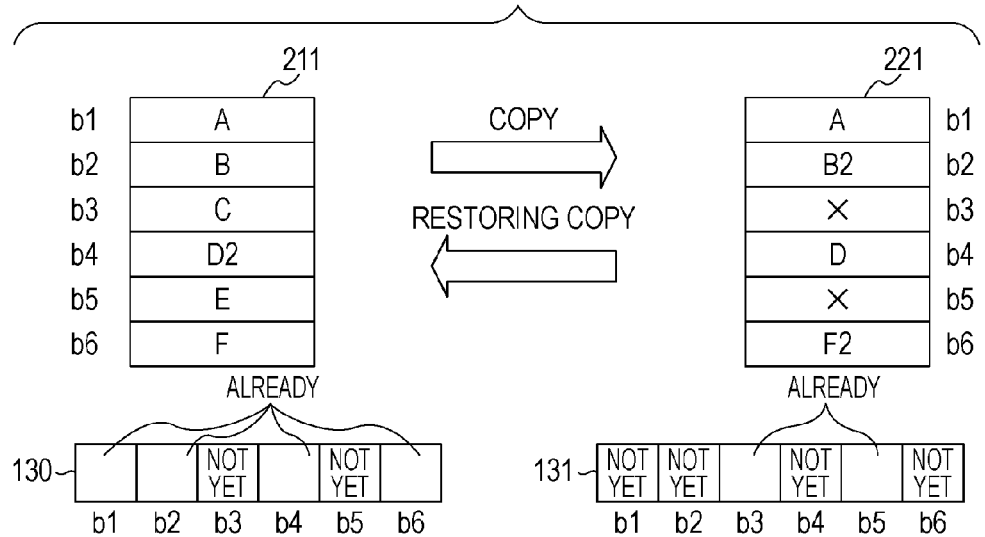
FIGS. 9A and 9B are diagrams each illustrating a flow of a restore copy process according to an embodiment of the present invention.
Figure 9B:
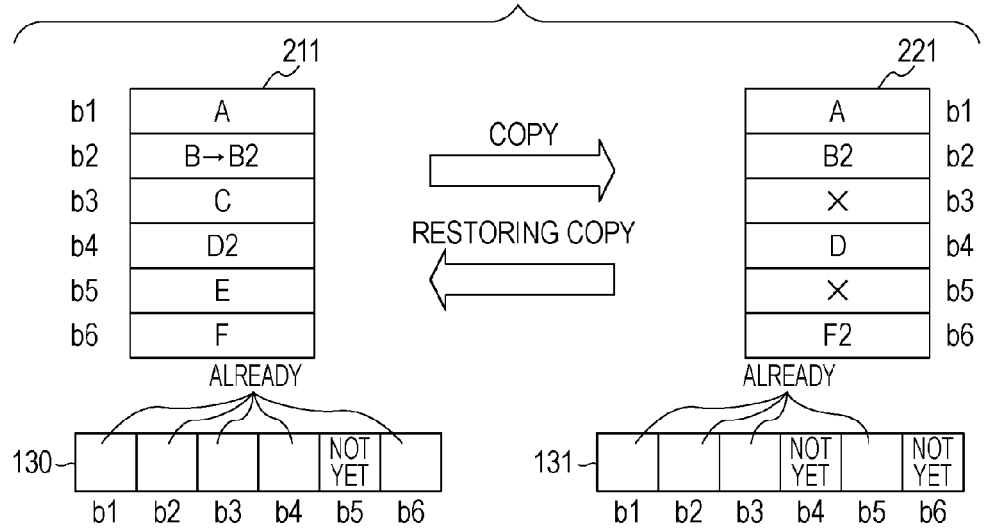

FIGS. 9A and 9B are diagrams each illustrating a flow of a restore copy process. FIG. 9A illustrates operations subsequent to reception of a restore copying execution command. FIG. 9B illustrates operations performed while a restore copy process is being executed.

It is assumed that a restore copying execution command is received at the timing when, as illustrated in FIG. 8B, copy processes relating to the blocks b1, b2, b4 and b6 of the copy-destination 221 have been completed, and copy processes relating to the blocks b3, b5 have not yet been completed. In addition, in FIGS. 9A and 9B, "x" illustrated in each of certain blocks denotes that no data exists therein.

As illustrated in FIG. 9A, which illustrates operations subsequent to reception of a restore copying execution command, the disc control apparatus 100 receives a copying execution command, and confirms whether the received command is a restore copying execution command, or not. In order to confirm whether the received command is a restore copying execution command, or not, the disc control apparatus 100 verifies a correspondence between the received copying execution command and the content of the previously registered copy management table 1120, and thereby, determines whether a copy management table, in which a copy destination designated by the received copying execution command is the copy source 211, and further, a copy source designated thereby is the copy-destination 221, is detected, or not. If detected, it is determined that this copying execution command is a restore copying execution command. Once it is determined that this copying execution command is a restore copying execution command, the bitmap 131 is created, and a restore copy process, which allows pieces of data stored in the copy-destination (a copy source for the restore copying) 221 to be copied to the copy source (a copy-destination for the restore copying) 211, is performed. In an example illustrated in FIG. 9A, blocks of data stored in the copy-destination 221, that is, data A of the block b1, data B2 of the block b2, data D of the block b4 and data F2 of the block b6 are restore-copied to the copy source 211. In addition, "ALREADY" is set in each of bit 3 and bit 5 of the bitmap 131, which correspond to the blocks b3 and B5, each storing no data therein.

As illustrated in FIG. 9B, which illustrates operations performed while a restore copy process is being executed, a restore copy process is also performed for each block. The restore copy process is performed in an order from the block b1 to the block b2, and blocks of data stored in the block b1 and the block b2 of copy destination 221 are copied to the block b1 and the block b2 of the copy source 211. In this manner, a block of data stored in the block b2 of the copy source 211 is updated from B to B2.

Next, a case, in which a copying cancellation command for canceling a copy process has been received while, as illustrated in FIG. 9B, a copy process and a restore copy process are being performed, that is, under the status where the combined status is (INPROGRESS-INPROGRESS), will be described below.

Figure 10A:
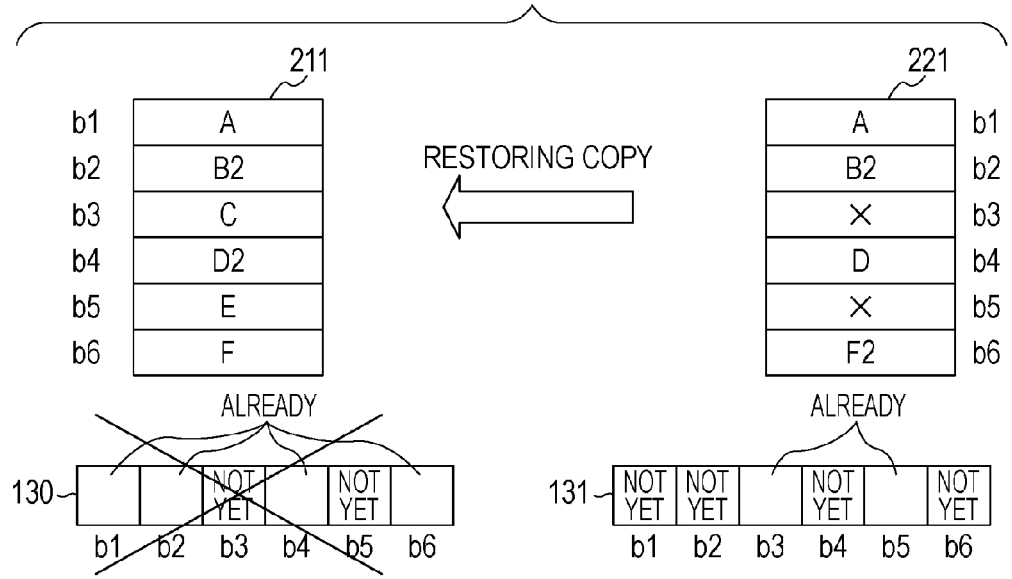
FIGS. 10A and 10B are diagrams each illustrating a flow of processes performed when a copy process is cancelled, according to an embodiment of the present invention.
Figure 10B:
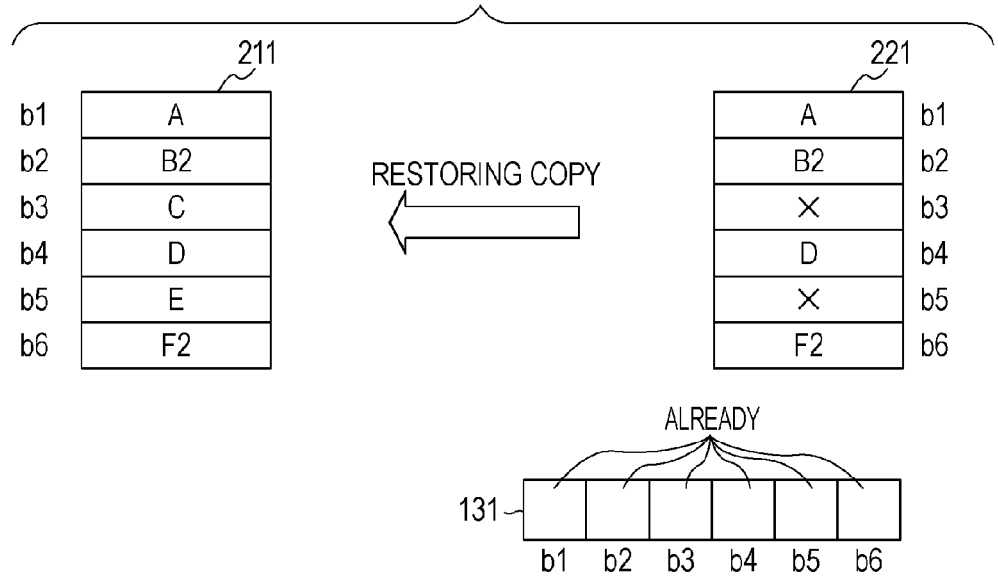

FIGS. 10A and 10B are diagrams each illustrating a flow of processes performed when a copy process is cancelled. FIG. 10A illustrates operations performed subsequent to reception of a copying cancellation command. FIG. 10B illustrates a condition after a restore copy has been completed.

As illustrated in FIG. 10A, which illustrates operations performed subsequent to reception of a copying cancellation command, upon receipt of a copying cancellation command, the bitmap 130 is deleted, and a relevant copy process in execution is interrupted. In addition, in the case where copying of data stored in a certain block has not yet been completed, the relevant copy process is interrupted immediately after copying of data stored in the certain block has been completed. In such a manner, the relevant copy process is interrupted under the condition where copying of data C of the block b3 and data E of the block b5 remains not started.

As illustrated in FIG. 10B, which illustrates a condition after a restore copy has been completed, even after the relevant copy process has been interrupted, the restore copy process continues to be performed. In an example illustrated in FIG. 10B, data stored in blocks of the copy-destination 221, corresponding to bits of the bitmap 131, each indicating "NOT YET", is restore-copied to the corresponding blocks of the copy source 211. In this manner, data D2 of the block b4 of the copy source 211 and data F of the block b6 thereof are updated to D and F2, respectively, and copy source 211 results in the same condition as that resulting from processing performed subsequent to reception of the restore copying execution command under the condition illustrated in FIG. 9A.

Here, it is assumed that a restore copying cancellation command has been received during a period of time from the timing of reception of a copying cancellation command, the condition of which is illustrated in FIG. 10A, until the timing of completion of the restore copy process, the condition of which is illustrated in FIG. 10B.

Figure 11:
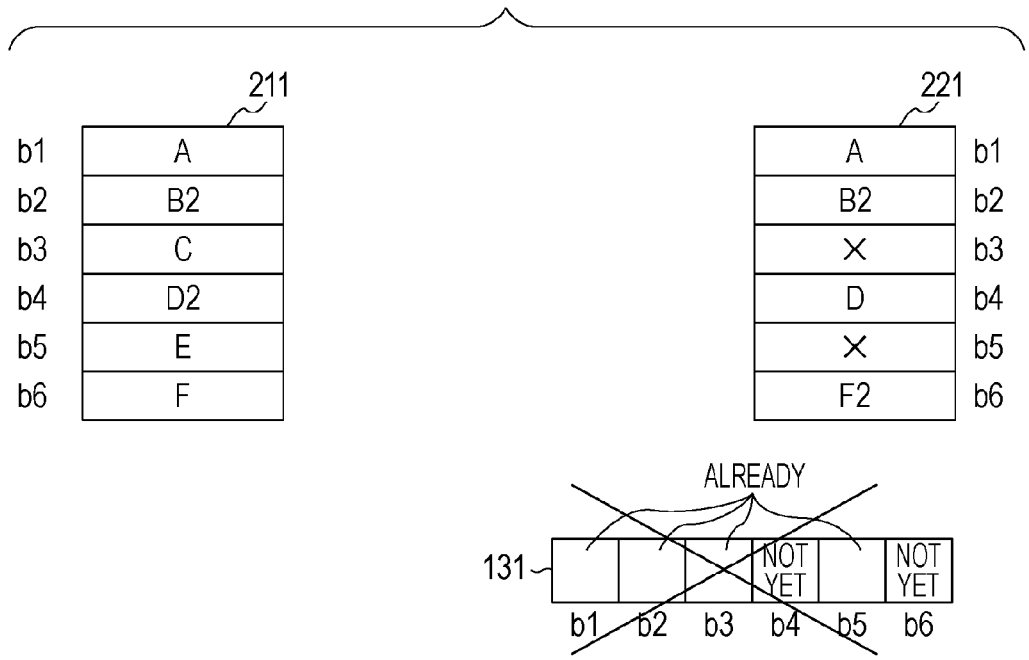
FIG. 11 is a diagram illustrating a flow of processes performed when a restore copying cancellation command has been received subsequent to interruption of a copy process, according to an embodiment of the present invention.

FIG. 11 is a diagram illustrating a flow of processes performed when a restore copying cancellation command has been received subsequent to interruption of a copy process.

FIG. 11 illustrates a condition at the timing when a restore copying cancellation command has been received. More specifically, the copy process was interrupted at the condition illustrated in FIG. 10A, and after data of block b4 of the copy source 211 has been updated to data of block b4 of the copy-destination 221, the restore copying cancellation command is received.

Here, if the restore copying cancellation command is received, the combined status transits to the inhibition status, that is (CANCEL-CANCEL). Thus, the restore copying cancellation command is invalidated, the restore copy process is caused to continue. As a result of this operation, the status transits to a status the same as that illustrated in FIG. 10B.

In addition, if the restore copying cancellation command is not invalidated, as a result, both of data become uncertain. In an example illustrated in FIG. 11, the status does not transit to the status illustrated in FIG. 10B owing to interruption of the restore copy process. That is, in the copy source 211, the restore process on block b6 of the copy source 211 is not performed, and therefore, data F is not updated to F2. On the other hand, in the blocks b3 and b5 of the copy-destination 221, no data remains exist. Therefore, as illustrated above, both of data result in invalid data.

As described above, by monitoring whether the reception of a command causes a status resulting from combination of statuses of volumes targeted for copying to transit to an inhibition status, or not, and invalidating the command if it is presumed that the reception of the command causes the combined status to an inhibition status, it is possible to prevent loss of data content stored in both of the volumes. As a result of this operation, it is possible to prevent a storage system from falling in undesirable conditions.

Next, a process procedure of a method for copying control performed by the disc control apparatus 100 will be described by using a flowchart.

Figure 12:
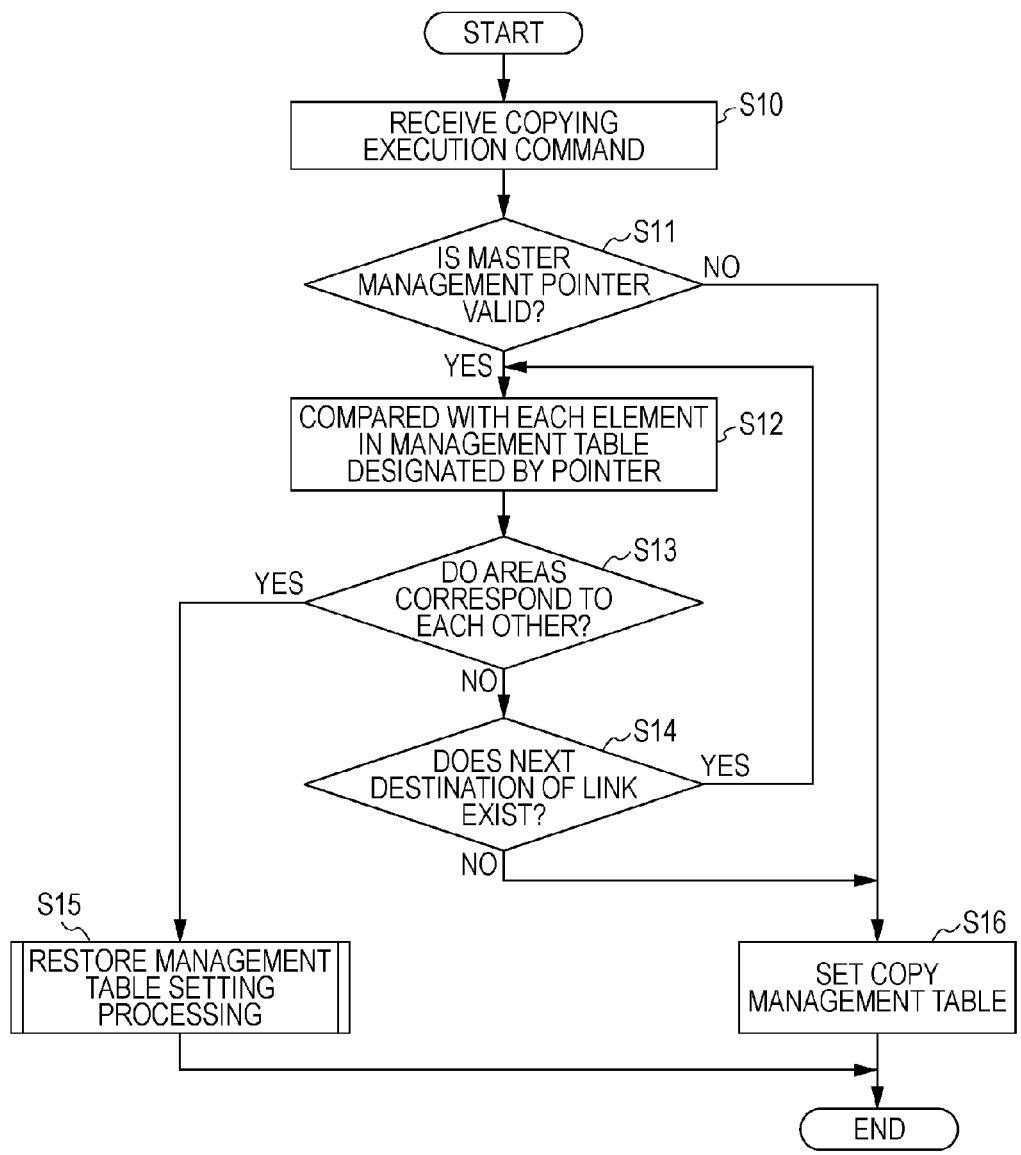
FIG. 12 is a flowchart illustrating a procedure of processes performed when a copying execution command has been inputted, according to an embodiment of the present invention.

FIG. 12 is a flowchart illustrating a procedure of processes performed when a copying execution command has been inputted.

[S10] Upon receipt a copying execution command, a copy-source data area and a copy-destination data area are specified. More specifically, from the content of the copying execution command, a copy-resource disc (a), a copy start position in the copy-resource disc (c) and a data length from the copy start position in the copy-source disc (d) are extracted, and thereby, the copy-source data area is specified. Further, a copy-destination disc (b), a copy start position in the copy-destination disc (e) and a data length from the copy start position in the copy-destination disc (f) are extracted, and thereby, the copy-destination data area is specified.

[S11] A pointer is read out from the copy master management pointer 1110, and it is determined whether a valid value is inputted in the pointer, or not. If a valid value is set in the pointer, the process flow proceeds to S12. If a valid value is not set in the pointer, that is, if a value of NULL is set therein, the process flow proceeds to S16.

[S12] Each of elements included in the copy management table 1120 designated by the read-out pointer is compared with each of elements included in the copy-resource data area and each of elements included in the copy-destination data area, which were read out in S10. Further, it is confirmed whether the copy-source data area designated by the inputted copying execution command is a copy-destination data area designated by elements included in the copy management table 1120, and further, the copy-destination data area designated by the inputted copying execution command is a copy-source data area designated by elements included in the copy management table 1120, or not. More specifically, it is assumed that the elements extracted in S10 are denoted by New-a, New-b, New-c, New-d, New-e and New-f, respectively, and the elements included in the copy management table 1120 designated by the pointer are denoted by a, b, c, d, e and f, respectively. In addition, a, b, c, d, e and f correspond to management items included in the copy management table 1120 illustrated in FIG. 5, respectively. Further, by verifying whether all of the following formulae: New-a=b, New-b=a, New-c=e, New-d=f, New-e=c and New-f=d are satisfied, it is determined whether conditions allowing a correspondence of the data areas are fulfilled, or not.

[S13] As a result of the verification performed in S12, if it is determined that the conditions allowing a correspondence of the data areas are fulfilled, the process flow proceeds to S15. If it is determined that the conditions allowing a correspondence of the data areas are not fulfilled, the process flow proceeds to S14.

[S14] If the conditions allowing a correspondence of the data areas are not fulfilled, a link pointer (y) included in this copy management table 1120, designating a subsequent copy management table, is read out, and it is determined whether a link to a subsequent copy management table is set therein, or not. If the link to a subsequent copy management table is not set therein, the process flow proceeds to S16. If the link to a subsequent copy management table is set therein, the process flow returns to S12, and the verification of the data areas is performed.

[S15] If the conditions allowing a correspondence of the data areas are fulfilled, processing for setting a restore management table is performed, and the process flow is terminated. Details of this processing will be detailed below.

[S16] If the conditions allowing a correspondence of the data areas are not fulfilled, and further, there are not any other copy management tables, each of the elements having been read out in S10 is set in a new copy management table 1120, and a link pointer is updated. That is, a link pointer (y) designating a subsequent copy management table, included in a copy management table to which the last link is connected, is linked to the newly created copy management table 1120. Subsequent to completion of the creation of the copy management table 1120, the process flow is terminated.

Figure 13:
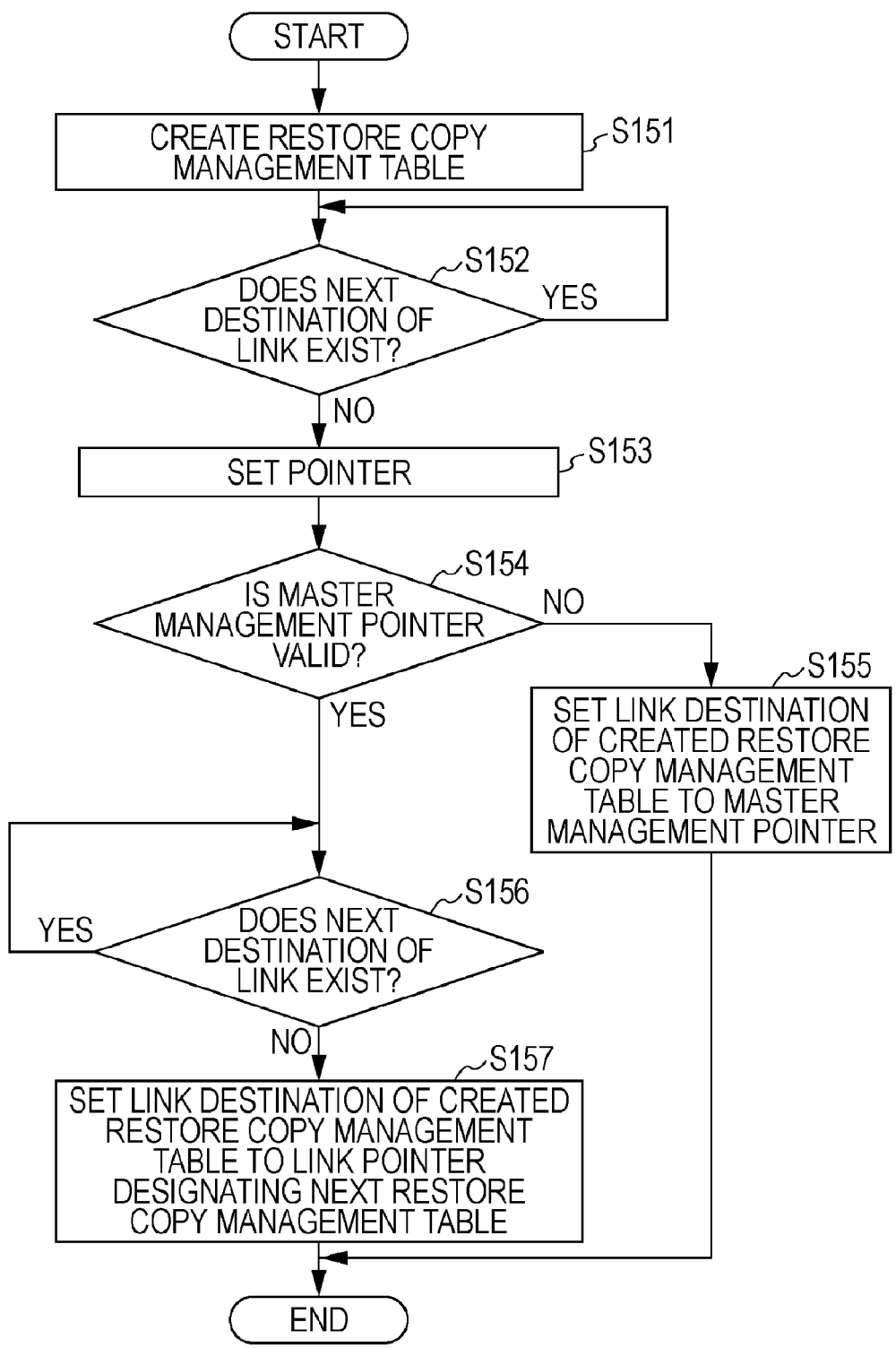
FIG. 13 is a flowchart illustrating a procedure of processes of setting a restore management table, according to an embodiment of the present invention.

FIG. 13 is a diagram illustrating a procedure of processing for setting a restore management table. When it is confirmed in S13 illustrated in FIG. 12 that the inputted copying execution command is a restore copying execution command, this processing is commenced.

[S151] A restore copy management table 1140 is newly created. A session identifier of a previously registered session, which is registered in the copy management table 1120 having data areas, for which the conditions allowing a correspondence of data areas are fulfilled, is set in the corresponding copy process (Exit) ID (1), and "INPROGRESS" is set in the corresponding copy process (Exit) status (2). A session identifier of a current session is set in the restore copy process (Restore), and "INPROGRESS" is set in the restore copy process (Restore) status (4).

[S152] The copy management table 1120 for the corresponding copy process, which was detected in S12 illustrated in FIG. 12, is updated. In the link pointer (z) designating a subsequent restore copy management table, which is included in the detected copy management table 1120, a link destination of the restore copy management table 1140 having been created in S151 is set. Further, the link pointer (y) designating a subsequent copy management table is read out from this copy management table 1120. If the value of the link pointer (y) is not an invalid value (NULL), it is determined that a link to a subsequent copy management table exists, and the link pointer (y) designating a subsequent copy management table included in the subsequent copy management table is read out. Until detection of an invalid value (NULL), proceeding to each of the following link pointers (y) is performed.

[S153] When an invalid value (NULL) is detected for a copy management table, in the link pointer (y) thereof, a link destination of the copy management table 1120 for the current session, which was created on the basis of the copying execution command having been received this time, is set. Further, in the copy management table 1120 for the current session, setting of each of the elements having been read out in S10 illustrated in FIG. 12 and a link pointer designating a restore copy management table 1140 is performed.

[S154] A pointer is read out from the restore copy master management pointer 1130, and it is determined whether a valid value is inputted therein, or not. If a valid value is set therein, the process flow proceeds to S156. If an invalid value (NULL) is set therein, the process flow proceeds to S155.

[S155] If a valid value is not set in the restore copy master management pointer 1130, in the restore copy master management pointer 1130, a link destination of the restore copy management table 1140 having been created in S151 is set, and then, the process flow is terminated.

[S156] If a valid value is set in the link pointer (5) designating a subsequent restore copy management table, it is determined that a link to a subsequent restore copy management table exists, and the link pointer (5) designating a subsequent restore copy management table, which is included in the subsequent restore copy management table, is read out. Until detection of an invalid value (NULL), proceeding to each of the following link pointers (5) is performed.

[S157] In the link pointer (5) designating a subsequent restore copy management table, for which an invalid value (NULL) is detected, a link destination of the restore copy management table 1140 having been created in S151 is set, and then, the process flow is terminated.

As a result of execution of the above-described process procedure, in accordance with a copying execution command, a copy master management pointer 1110 and a copy management table 1120, as well as a restore copy master management pointer 1130 and a restore copy management table 1140, are created.

Next, status transition processing will be described. Every time a copying cancellation command is inputted from the command reception unit 150, or the completion of a copy process is notified from the copying processing unit 140, the copying control unit 120 performs status transition processing for each session.

Figure 14:
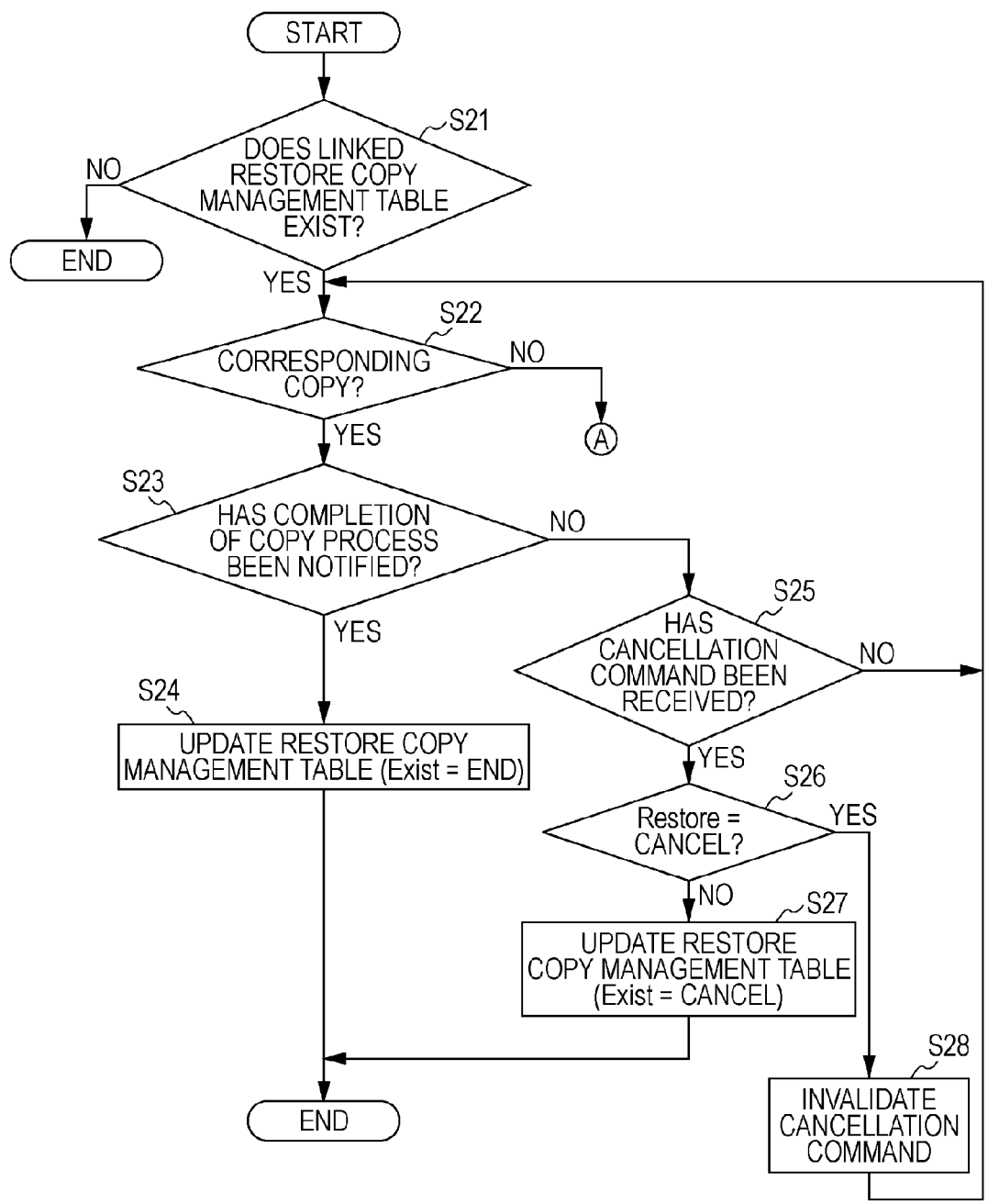
FIG. 14 is a flowchart illustrating a procedure of status transition processing (Exit) according to an embodiment of the present invention.

FIG. 14 is a flowchart illustrating a procedure of status transition processing (Exit).

[S21] The link pointer (z) designating a subsequent restore copy management table, which is included in the copy management table 1120 for a targeted session, is read out, and it is determined whether a valid value is set in the link pointer (z), or not. If it is determined that a valid value is set in the link pointer (z), the process flow proceeds to S22. If an invalid value (NULL) is detected, the targeted session is an independent copy process, thus, the copy process is interrupted, and then, the process flow is terminated.

[S22] If a valid value is set in the link pointer (z) of the copy management table 1120, a correspondence between the corresponding copy process (Exist) ID (1) and a session identifier of the targeted session, as well as a correspondence between the restore copy process (Restore) ID (3) and a session identifier of the targeted session, the corresponding copy process (Exist) ID (1) and the restore copy process (Restore) ID (3) being included in the restore copy management table 1140 designated by the link pointer (z), is verified. If the targeted session is a corresponding copy process, the process flow proceeds to S23. If the targeted session is a restore copy process, the process flow proceeds to a branch point A illustrated in FIG. 15.

[S23] If the targeted session is Exist, it is determined whether the completion of the copy process has been notified, or not. If the completion of the copy process, having been notified by the copying processing unit 140, is determined, the process flow proceeds to S24. If the completion of the copy process is not determined, the process flow proceeds to S25.

[S24] If it is determined that the completion of the copy process has been notified, the corresponding copy process (Exist) status (2) is updated to "END". Further, if the restore copy process (Restore) status (4) is "END" or "CANCEL", this restore copy management table 1140 is deleted. At this time, link pointers each designating a subsequent restore copy management table, which are included in both a restore copy management table linked to this restore copy management table 1140, and the restore copy master management pointer 1130, are updated. Further, the process flow is terminated.

[S25] If it is determined that the completion of the copy process has not been notified, it is determined whether a copying cancellation command has been inputted, or not. If it is determined that the copying cancellation command has been inputted, the process flow proceeds to S26. If it is determined that the copying cancellation command has not been inputted, the process flow returns to S22 and waits for a next command or a next notification.

[S26] If it is determined that a copying cancellation command has been inputted, the status of the restore copy process (Restore) status (4) of the restore copy management table 1140 is confirmed, and it is determined whether the status thereof is "CANCEL", or not. If the status thereof is not "CANCEL", the process flow proceeds to S27. If the status thereof is "CANCEL", the process flow proceeds to S28.

[S27] If the status of the restore copy process (Restore) status (4) is not "CANCEL", the copying cancellation command for canceling the copy process is validated. The status of the corresponding copy process (Exist) status (2) is set to "CANCEL". Further, the copy process is interrupted, and the process flow is terminated.

[S28] If the status of the restore copy process (Restore) status (4) is "CANCEL", the copying cancellation command for canceling the copy process is invalidated. The process flow returns to S22, and waits for a next command or a next notification.

Figure 15:
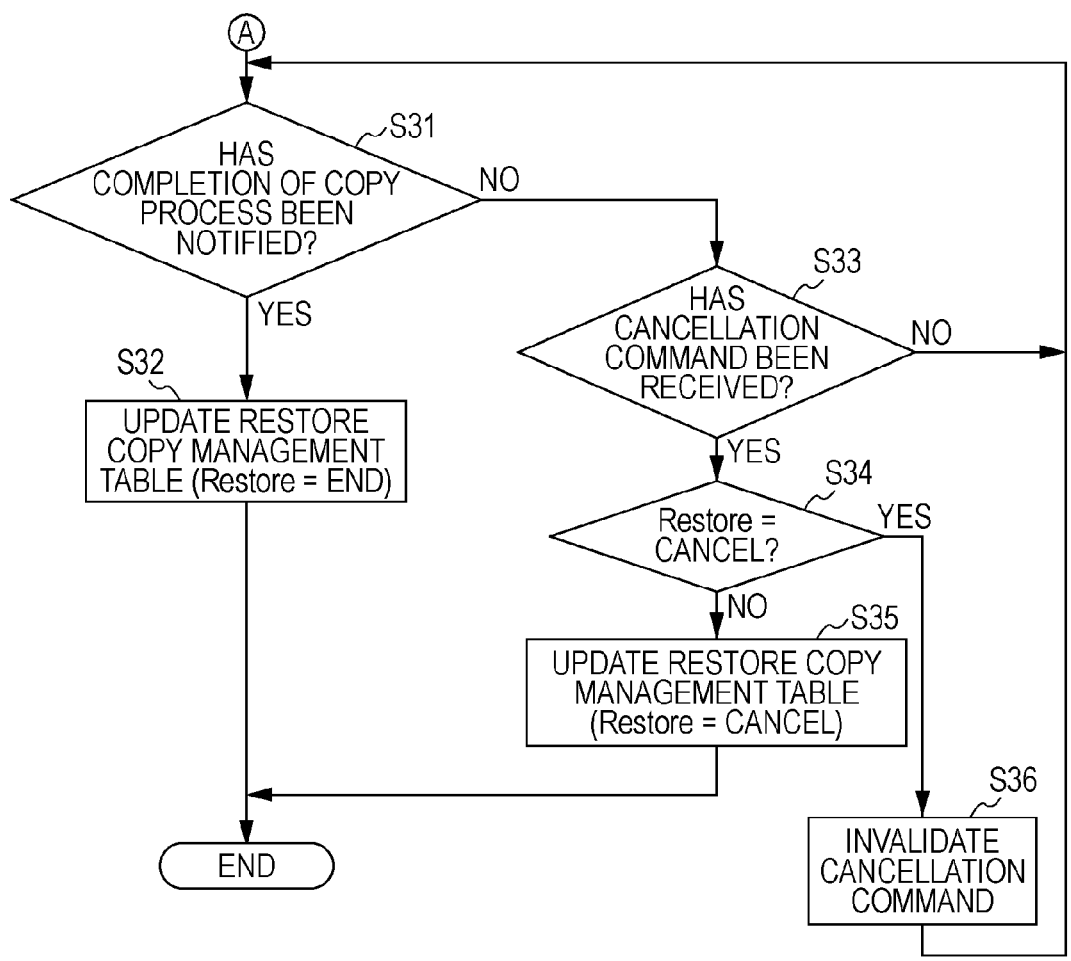
FIG. 15 is a flowchart illustrating a procedure of status transition processing (Restore) according to an embodiment of the present invention.

FIG. 15 is a flowchart illustrating a procedure of status transition processing (Restore). When it is determined in S22 illustrated in FIG. 14 that the current session is Restore, the following process procedure is performed.

[S31] If the current session is Restore, it is determined whether the completion of the restore copy process has been notified, or not. If it is determined that the completion of the restore copy process has been notified by the copying processing unit 14, the process flow proceeds to S32. If it is determined that the completion of the restore copy process has not been notified, the process flow proceeds to S33.

[S32] If it is determined that the completion of the restore copy process has been notified, the restore copy process (Restore) status (4) of the restore copy management table 1140 is updated to "END". Further, if the process status of the corresponding copy process (Exist) status (2) is "END" or "CANCEL", this restore copy management table 1140 is deleted. At this time, link pointers each designating a subsequent restore copy management table, which are included in a restore copy management table linked to this restore copy management table 1140, and the restore copy master management pointer 1130, respectively, are updated. Further, the process flow is terminated.

[S33] If it is determined that the completion of the restore copy process has not been notified, it is determined whether a restore copying cancellation command has been inputted, or not. If it is determined that the restore copying cancellation command has been inputted, the process flow proceeds to S34. If it is determined that the restore copying cancellation command has not been inputted, the process flow returns to S31 and waits for a next command or a next notification.

[S34] If it is determined that a restore copying cancellation command has been inputted, the status of the restore copy process (Exist) status (2) of the restore copy management table 1140 is confirmed, and it is determined whether the status thereof is "CANCEL", or not. If the status thereof is not "CANCEL", the process flow proceeds to S35. If the status thereof is "CANCEL", the process flow proceeds to S36.

[S35] If the status of the corresponding copy process (Exist) status (2) is not "CANCEL", the restore copying cancellation command for canceling the restore copy process is validated. The status of the restore copy process (Restore) status (4) is set to "CANCEL". Further, the restore copy process is interrupted, and the process flow is terminated.

[S36] If the status of the corresponding copy process (Exist) status (2) is "CANCEL", the restore copying cancellation command for canceling the restore copy process is invalidated. The process flow returns to S31, and waits for a next command or a next notification.

By performing the above-described process procedure, during a period of time while a copy process and a restore copy process are concurrently being performed, it is determined whether execution of either a cancellation command for cancelling the copy process or a cancellation command for cancelling the restore copy process causes a transition to an inhibition status, or not. Further, if the transition to an inhibition status is presumed to occur, the cancellation command is invalidated. In this manner, it is possible to prevent data stored in both data areas from falling in loss conditions.

In the above-described second embodiment, a copy process corresponding to a status thereof, i.e., copy process in execution, or a restore copy processing corresponding to a status thereof, i.e., restore copy in execution, is interrupted by an inputted cancellation command, and subsequently, when a cancellation command for the remaining current session has been received, this cancellation command is invalidated.

However, it is presumed that, intentionally, such a method of issuing cancellation commands is employed. Therefore, as a third embodiment according to the present invention, a function, in which senders of the cancellation commands are confirmed, and if a sender of a subsequent cancellation command is the same as a sender of a previous cancellation command, the subsequent cancellation command is not invalidated, is added to the second embodiment according to the present invention.

Hereinafter, points different from those of the second embodiment will be described.

Figure 16:
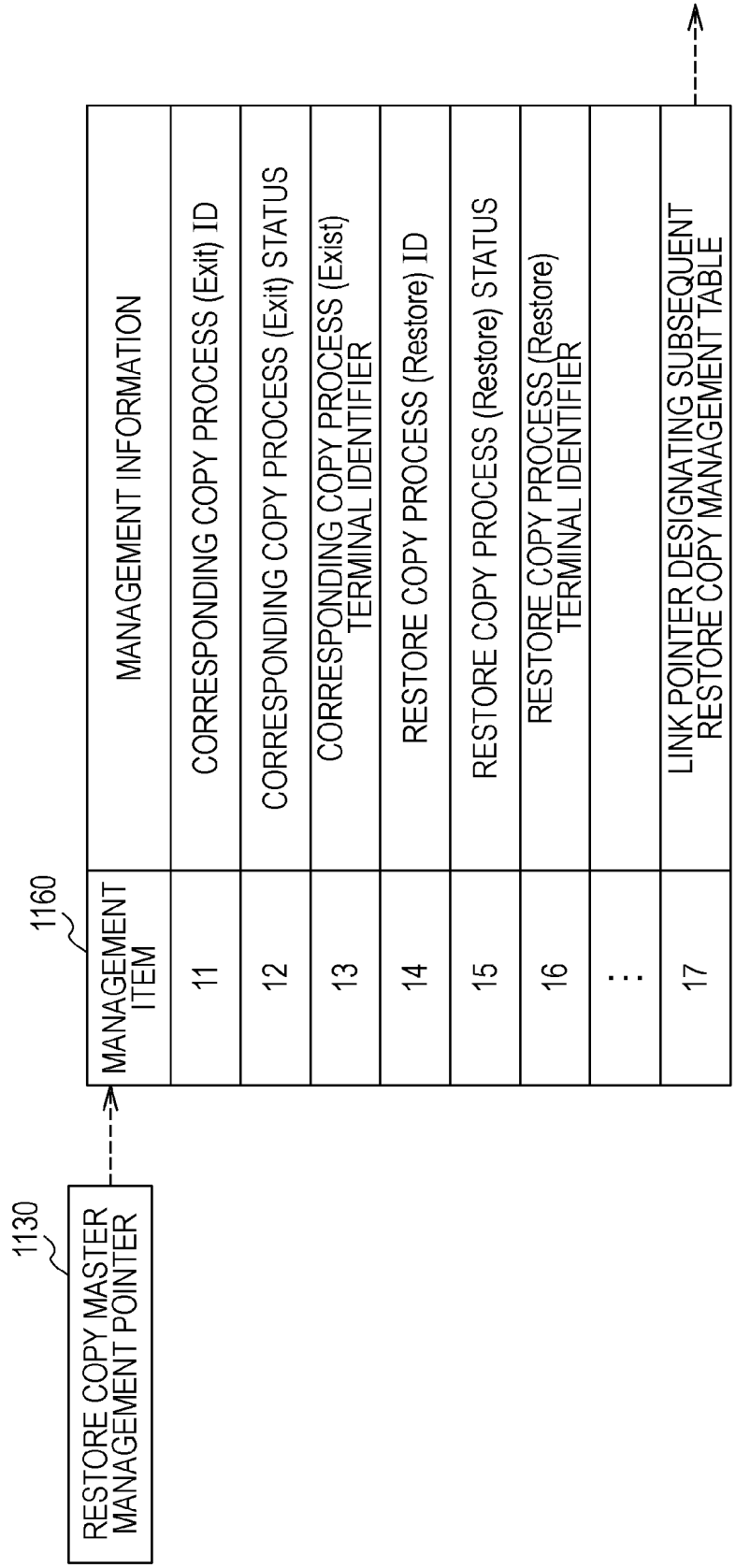
FIG. 16 is a diagram illustrating an example of a restore copy management table accepting a cancellation command from the same terminal, according to an embodiment of the present invention.

In the third embodiment, areas storing therein identifiers of senders which have issued copying cancellation commands are provided in a restore copy management table. FIG. 16 is a diagram illustrating an example of a restore copy management table accepting a cancellation command from the same terminal.

The restore copy master management pointer 1130 is the same as that illustrated in FIG. 6.

In the restore copy management table 1160, a corresponding copy process (Exist) ID (11), information items, such as a corresponding copy process (Exist) status (12), a corresponding copy process (Exist) terminal identifier (13), a restore copy process (Restore) ID (14), a restore copy process (Restore) status (15), a restore copy process (Restore) terminal identifier (16) and a link pointer designating a subsequent restore copy management table (17), are set.

Among these information items, information items except for the corresponding copy process (Exist) terminal identifier (13) and the restore copy process (Restore) terminal identifier (16) are the same as those of the restore copy management table 1140, and thus, are omitted from explanation.

In the corresponding copy process (Exist) terminal identifier (13), upon receipt of a copying cancellation command corresponding to this Exist session, a terminal which is a sender of the copying cancellation command is specified, and a terminal identifier of the terminal is set. When the restore copy management table 1160 is created in response to a copying execution command, an invalid value (NULL) is set therein. In the restore copy process (Restore) terminal identifier (16), upon receipt of a restore copying cancellation command corresponding to this Restore session, a terminal which is a sender thereof is specified, and a terminal identifier thereof is set. In the same manner as described above, an invalid value (NULL) is set therein as an initial value.

The specification of terminals can be performed by using, for example, communication information for specifying a sender included in a copying cancellation command, such as an internet protocol (IP) address of a sender or a media access control address of a sender. Further, when performing a log-in operation, the log-in operation is performed by using an identifier and the like in accordance with the log-in. Further, the terminal identifiers are added on the basis of such specific information.

Further, it is the same that an inhibition status occurs when a status of a corresponding copy process (Exist) is "CANCEL", and further, a status of a restore copy process (Restore) is "CANCEL", that is, when the statuses thereof are CANCEL-CANCEL. However, it is to be noted that, in the case where the corresponding copy process (Exist) terminal identifier (13) and the restore copy process (Restore) terminal identifier (16) correspond to each other, both of the copying cancellation command commands are validated.

Next, a process procedure of copy control processing performed by verifying a correspondence of terminal identifiers will be described by using a flowchart.

The processing performed by verifying a correspondence of terminal identifiers includes processing for registering terminal identifiers, having been acquired by using the above-described methods, in a restore copy management table, in addition to processing for setting a restore copy management table, which is the same as the processing according to the second embodiment, which is illustrated in FIG. 13, and thus, the processing for setting a restore copy management table is omitted from explanation.

Hereinafter, status transition processing, in which a correspondence of terminal identifiers is verified, will be described.

Figure 17:
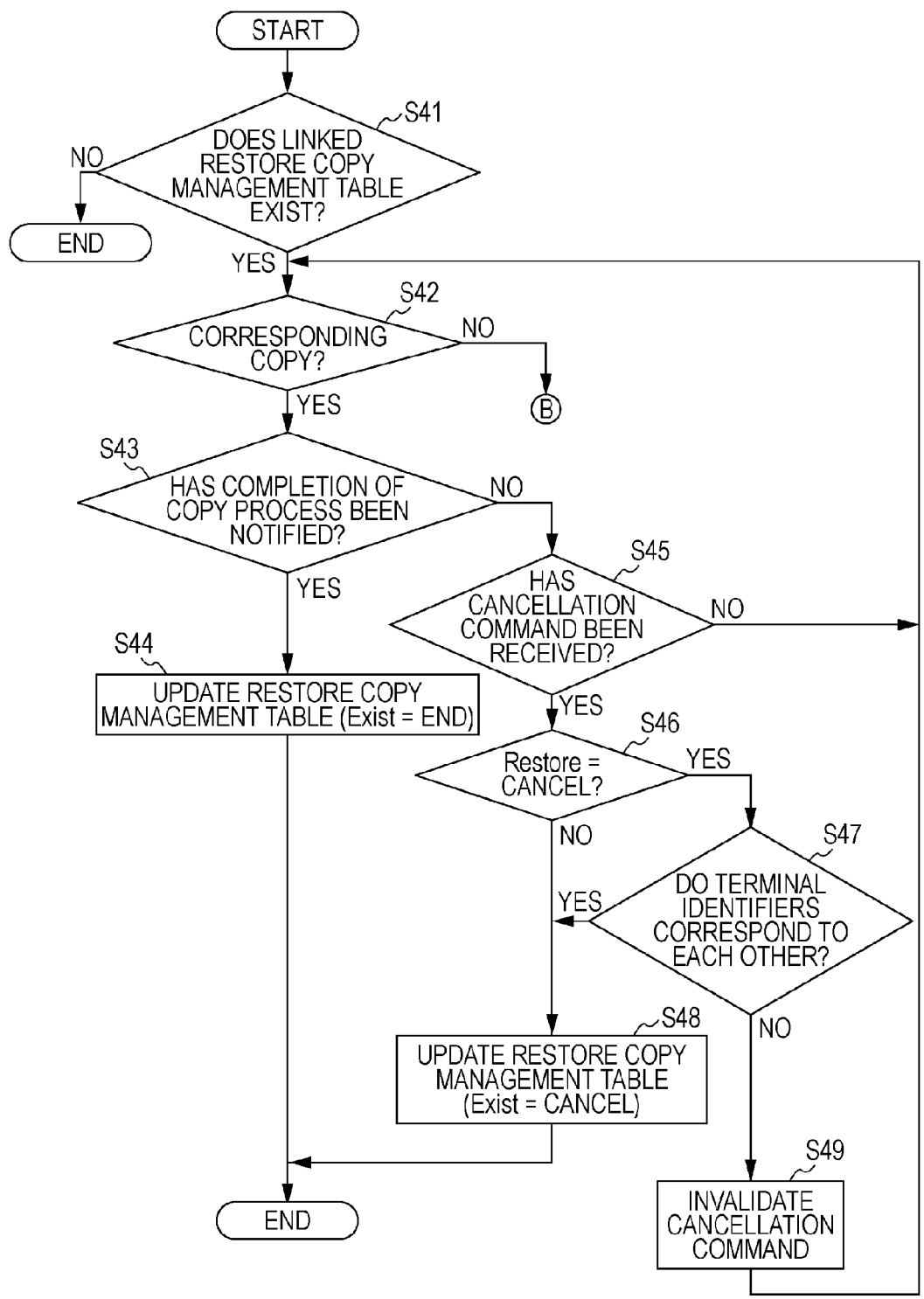
FIG. 17 is a flowchart illustrating a procedure of status transition processing (Exist) accepting a cancellation command from the same terminal, according to an embodiment of the present invention.

FIG. 17 is a flowchart illustrating a procedure of status transition processing (Exist) accepting a cancellation command from the same terminal.

[S41] The link pointer (z) designating a subsequent restore copy management table, which is included in the copy management table 1120 for a targeted session, is read out, and it is determined whether a valid value is set in the link pointer (z), or not. If it is determined that a valid value is set in the link pointer (z), the process flow proceeds to S42. If an invalid value (NULL) is detected, the targeted session is an independent copy process, thus, the copy process is interrupted, and then, the process flow is terminated.

[S42] If a valid value is set in the link pointer (z) of the copy management table 1120, a correspondence between the corresponding copy process (Exist) ID (11) and a session identifier of the targeted session, as well as a correspondence between the restore copy process (Restore) ID (14) and a session identifier of the targeted session, the corresponding copy process (Exist) ID (11) and the restore copy process (Restore) ID (14) being included in the restore copy management table 1160 designated by the link pointer (z), is verified. If the targeted session is a corresponding copy process, the process flow proceeds to S43. If the targeted session is a restore copy process, the process flow proceeds to a branch point B illustrated in FIG. 18.

[S43] If the targeted session is Exist, it is determined whether the completion of the copy process has been notified, or not. If it is determined that the completion of the copy process has been notified by the copying processing unit 140, the process flow proceeds to S44. If the completion of the copy process is not determined, the process flow proceeds to S45.

[S44] If it is determined that the completion of the copy process has been notified, the corresponding copy process (Exist) status (12) of the restore copy management table 1140 is updated to "END". Further, if the process status of the restore copy process (Restore) status (15) is "END" or "CANCEL", the relevant restore copy management table 1150 is deleted. At this time, link pointers each designating a subsequent restore copy management table, which are included in a restore copy management table linked to this restore copy management table 1160, and the restore copy master management pointer 1130, respectively, are updated. Further, the process flow is terminated.

[S45] If the completion of the copy process is not determined, then, it is determined whether a copying cancellation command has been inputted, or not. If it is determined that the copying cancellation command has been inputted, the process flow proceeds to S46. If it is determined that the copying cancellation command has not been inputted, the process flow returns to S42 and waits for a next command or notification.

[S46] If it is determined that a copying cancellation command has been inputted, the status of the restore copy process (Restore) status (15) of the restore copy management table 1140 is confirmed, and it is determined whether the status thereof is "CANCEL", or not. If the status thereof is not "CANCEL", the process flow proceeds to S48. If the status thereof is "CANCEL", the process flow proceeds to S47.

[S47] By verifying the corresponding copy process (Exist) terminal identifier (13) and the restore copy process (Restore) terminal identifier (16) of the restore copy management table 1160, it is determined whether a correspondence therebetween is fulfilled, or not. If the correspondence therebetween is fulfilled, the process flow proceeds to S48. If the correspondence therebetween is not fulfilled, the process flow proceeds to S49.

[S48] In the case where the status of the restore copy process (Restore) status (15) is not "CANCEL", or the command for canceling the copy process is issued by the same terminal as that which issued the command for canceling the restore copy process, the command for canceling the copy process is validated. The status of the corresponding copy process (Exist) status (12) of the restore copy management table 1160 is set to "CANCEL". Further, the copy process is interrupted, and then, the process flow is terminated.

[S49] In the case where the status of the restore copy process (Restore) status (15) is "CANCEL", and further, the command for canceling the copy process does not correspond to the terminal which issued the command for canceling the restore copy process, the command for canceling the copy process is invalidated. The reason for this invalidation is that different users are more likely to have issued the commands independently. The process flow returns to S42, and waits for a next command or notification.

Figure 18:
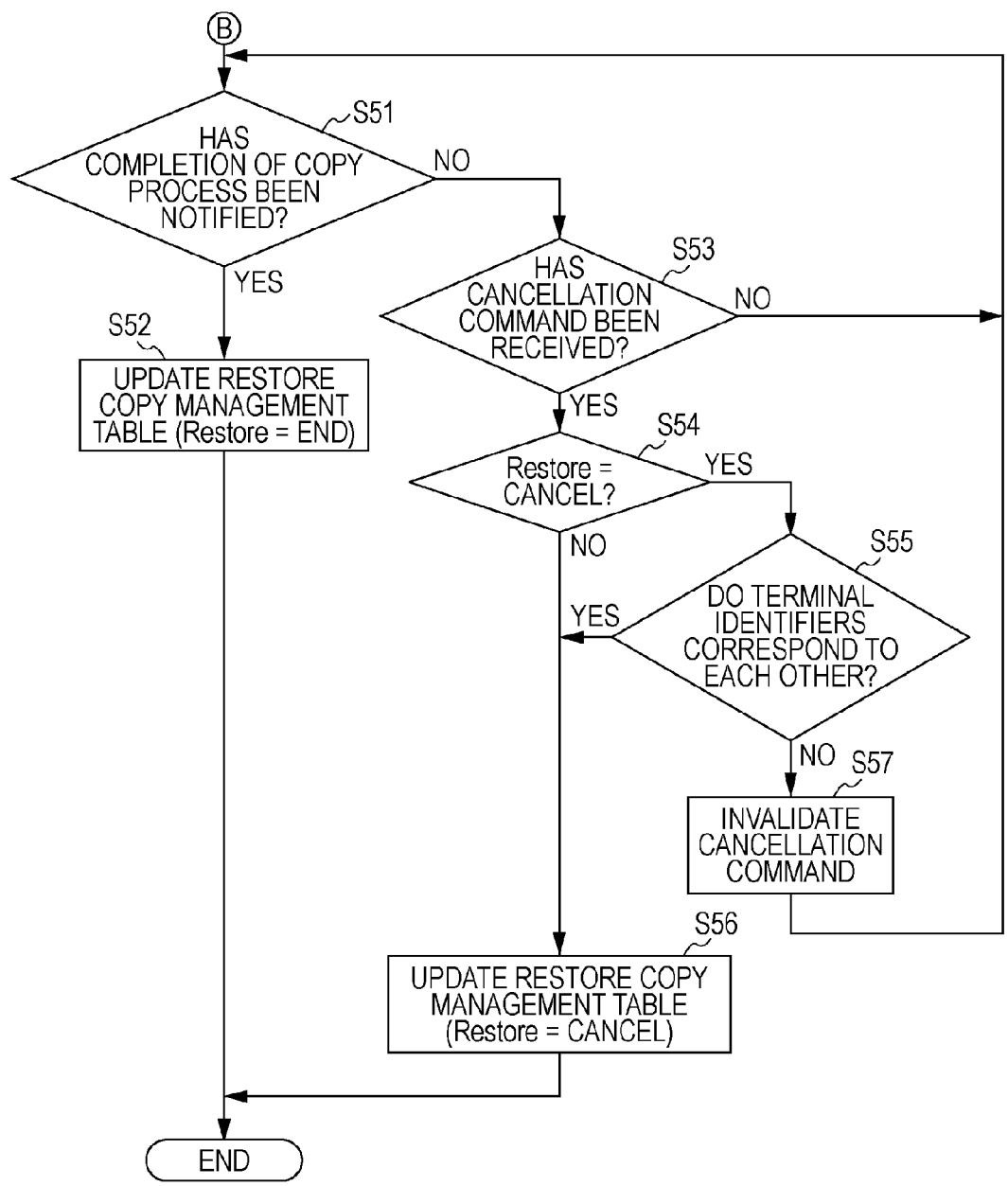
FIG. 18 is a flowchart illustrating a procedure of status transition processing (Restore) accepting a cancellation command from the same terminal, according to an embodiment of the present invention.

FIG. 18 is a flowchart illustrating a procedure of status transition processing (Restore) accepting a cancellation command from the same terminal. When it is determined in S42 illustrated in FIG. 17 that the current session is Restore, the following processes are performed.

[S51] If the targeted session is Restore, it is determined whether the completion of the copy process has been notified, or not. If it is determined that the completion of the copy process has been notified by the copying processing unit 140, the process flow proceeds to S52. If the completion of the copy process is not determined, the process flow proceeds to S53.

[S52] If it is determined that the completion of the restore copy process has been notified, the restore copy process (Restore) status (15) of the restore copy management table 1160 is updated to "END". Further, if the process status of the corresponding copy process (Exist) status (12) is "END" or "CANCEL", this restore copy management table 1160 is deleted. At this time, link pointers each designating a subsequent restore copy management table, which are included in a restore copy management table linked to this restore copy management table 1160, and the restore copy master management pointer 1130, respectively, are updated. Further, the process flow is terminated.

[S53] If it is determined that the completion of the restore copy process has not been notified, it is determined whether the restore copying cancellation command has been inputted, or not. If it is determined that the restore copying cancellation command has been inputted, the process flow proceeds to S54. If it is determined that the restore copying cancellation command has not been inputted, the process flow returns to S51 and waits for a next command or notification.

[S54] If it is determined that the restore copying cancellation command has been inputted, the status of the corresponding copy process (Exit) status (12) of the restore copy management table 1160 is confirmed, and it is determined whether the status thereof is "CANCEL", or not. If the status thereof is not "CANCEL", the process flow proceeds to S56. If the status thereof is "CANCEL", the process flow proceeds to S55.

[S55] By verifying the corresponding copy process (Exist) terminal identifier (13) and the restore copy process (Restore) terminal identifier (16) of the restore copy management table 1160, it is determined whether a correspondence therebetween is fulfilled, or not. If the correspondence therebetween is fulfilled, the process flow proceeds to S56. If the correspondence therebetween is not fulfilled, the process flow proceeds to S57.

[S56] In the case where the status of the corresponding copy process (Exist) status (12) is not "CANCEL", or the command for canceling the restore copy process is issued by the same terminal as a terminal which issued the command for canceling the corresponding copy process, the command for canceling the restore copy process is validated. The status of the restore copy process (Restore) status (15) of the restore copy management table 1160 is set to "CANCEL". Further, the copy process is interrupted, and then, the process flow is terminated.

[S57] In the case where the status of the corresponding copy process (Exist) status (12) is "CANCEL", and further, the command for canceling the restore copy process does not correspond to the terminal which issued the command for canceling the corresponding copy process, the command for canceling the restore copy process is invalidated. The process flow returns to S51, and waits for a next command or notification.

By performing the above-described process procedure, during a period of time while a copy process and a restore copy process are concurrently being performed, it is determined whether execution of either a cancellation command for cancelling the copy process or a cancellation command for cancelling the restore copy process causes a transition to an inhibition status, or not. Further, if the transition to an inhibition status is presumed to occur, the cancellation command is invalidated. In this manner, it is possible to prevent data stored in both data areas from falling in loss conditions.

In addition, the above-described processes can be realized by a computer. In this case, programs, in which contents of processes performed so as to fulfill the functions to be included in the storage control apparatus are written, are provided. By causing the computer to execute the programs, the above-described process functions are realized on the computer. It is possible to record and retain the programs, in which the above-described process functions are written, in a certain recording medium readable from computers.

In order to distribute the programs, for example, it is possible to sell portable recording media, such as a digital versatile disc (DVD) or a compact disc read only memory (CD-ROM), including the programs recorded therein. Further, it is also possible to store the programs in a certain recording medium of a server computer in advance, and transfer the programs from the server computer to other computers via networks.

A computer, which has started up to execute the programs, for example, loads the programs recorded in a certain portable recording medium, or programs having been transferred from a certain server computer, to a storage device of the computer. Further, the computer reads out the programs from the storage device thereof, and executes processes in accordance with the programs. In addition, the computer can also read out the programs directly from a certain portable recording medium. Further, every time the computer receives programs transferred from a server computer, the computer can also execute processes sequentially in accordance with the received programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method for a storage control apparatus for controlling a plurality of storage units, each of the plurality of storage units having data area for storing data, the method comprising:
receiving a first command for copying data stored in a first data area of the plurality of storage units into a second data area of the plurality of storage units from an exterior;
executing copying in accordance with the first command;
receiving a second command for copying data stored in the second data area into the first data area from the exterior;
executing copying in accordance with the second command;
receiving a third command for cancelling copying corresponding to the first command and a fourth command for cancelling copying corresponding to the second command from the exterior prior to completion of copying process corresponding to one of the first and second command; and
invalidating one of the third command and the fourth command.

2. The method according to claim 1, further comprising, permitting accessing the data stored in the first data area and the second data area corresponding to the first command and the second command from the exterior in spite of completion or noncompletion of the copying process.

3. The method according to claim 1, further comprising, detecting that tone or more parts of a copy-source data area and tone or more parts of a copy-destination data area of one copying process for the first command are overlapped by a part of a copy-destination data area and a part of a copy-source data area of other copying process for the second command, respectively.

4. The method according to claim 3, further comprising, associating one of the overlapping copying processes with a restore copy process.

5. The method according to claim 4, further comprising, associating with a copying process status information of progress status information that indicates the copying process is in progress, the end status information that indicates that the copying process is completed, and the cancel status information that indicates the copying process is cancelled.

6. The method according to claim 5, further comprising, detecting the cancel status information for the copying process and the cancel status information for the restore copy process, and rejecting acceptance of one of the third command and the fourth command.

7. The method according to claim 1, further comprising:
obtaining a first terminal identifier for identifying a first terminal which sent the first command and a second terminal identifier for identifying second terminal which sent the second command, and
canceling the copying process corresponding to the first and second command, when the storage apparatus receives the third command and fourth command from same terminal.

8. A storage control apparatus for controlling a plurality of storage units, each of the plurality of storage units having data area for storing data, comprising:
an interface connecting to an exterior and the plurality of storage units for communicating data and commands; and
a computer processor for executing functions of:
receiving a first command for copying data stored in a first data area of the plurality of storage units into a second data area of the plurality of storage units from an exterior;
executing copying in accordance with the first command;

receiving a second command for copying data stored in the second data area into the first data area from the exterior;

executing copying in accordance with the second command;

receiving a third command for cancelling copying corresponding to the first command and a fourth command for cancelling copying corresponding to the second command from the exterior prior to completion of copying process corresponding to one of the first and second command; and invalidating one of the third command and the fourth command.

9. The storage control apparatus according to claim 8, wherein the computer processor further executes to permit accessing the data stored in the first data area and the second data area corresponding to the first command and the second command from the exterior in spite of completion or noncompletion of the copying.

10. The storage control apparatus according to claim 8, wherein the computer processor further executes to detect that one or more parts of copy-source data area and one or more parts of copy-destination data area for one copying process are overlapped by a copy-destination data area and a copy-source data area for other copying process, respectively.

11. The storage control apparatus according to claim 10, wherein the computer processor further executes to associate one of the overlapping copying with a restore copy process.

12. The storage control apparatus according to claim 11, wherein the computer processor further executes to associate with a copying process status information of progress status information that indicates that the copying process is in progress, end status information that indicates the copying process is completed, and cancel status information that indicates the copying process is cancelled.

13. The storage control apparatus according to claim 12, wherein the computer processor further executes to detect the cancel status information for the copying process and the cancel status information for the restore copy process, and rejecting acceptance of one of the third command and the fourth command.

14. The storage control apparatus according to claim 8, wherein the computer processor further executes to obtain a first terminal identifier for identifying the first terminal which sent the first command and a second terminal identifier for identifying the second terminal which sent the second command, and canceling the copying process corresponding to the first and second command, when the storage apparatus receives the third command and fourth command from same terminals.

15. A computer program product embodied on a computer-readable medium and comprising code to control operation of a storage control apparatus including respective data areas for storing data, the code, when executed, causing a computer to perform:

receiving a first command for copying data stored in a first data area of the plurality of storage units into a second data area of the plurality of storage units from an exterior;

executing copying in accordance with the first command;

receiving a second command for copying data stored in the second data area into the first data area from the exterior;

executing copying in accordance with the second command;

receiving a third command for cancelling copying corresponding to the first command and a fourth command for cancelling copying corresponding to the second command from the exterior prior to completion of copying process corresponding to one of the first and second command; and invalidating one of the third command and the fourth command.

16. The computer program product according to claim 15, wherein the code further causing the computer to perform permitting accessing the data stored in the first data area and the second data area corresponding to the first command and the second command from the exterior in spite of completion or noncompletion of the copying.

17. The computer program product according to claim 15, wherein the code further causing the computer to perform detecting that one or more parts of copy-source data area and one or more parts of copy-destination data area for one copying process are overlapped by a copy-destination data area and a copy-source data area for other copying process, respectively.

18. The computer program product according to claim 17, wherein the code further causing the computer to perform associating one of the overlapping copying processes with a restore copy process.

19. The computer program product according to claim 18, wherein the code further causing the computer to perform associating with a copying process status information of progress status information that indicates the copying process is in progress, end status information that indicates the copying process is completed, and cancel status information that indicates the copying process is cancelled.

20. The computer program product according to claim 19, wherein the code further causing the computer to perform detecting the cancel status information for the copying process and the cancel status information for the restore copy process, and rejecting acceptance of one of the third command and the fourth command.

* * * * *

UNITED STATES PATENT AND TRADEMARK OFFICE
CERTIFICATE OF CORRECTION

PATENT NO. : 8,352,693 B2
APPLICATION NO. : 12/792997
DATED : January 8, 2013
INVENTOR(S) : Yoshinari Oono It is certified that error appears in the above-identified patent and that said Letters Patent is hereby corrected as shown below:

Column 26, Line 25, In Claim 3, delete "tone" and insert -- one --, therefor.
Column 26, Line 26, In Claim 3, delete "tone" and insert -- one --, therefor.
Column 27, Line 32, In Claim 12, before "the" delete "that".

Signed and Sealed this
Second Day of April, 2013

Teresa Stanek Rea
*Acting Director of the United States Patent and Trademark Office*